US008596655B2

(12) United States Patent
Belanger et al.

(10) Patent No.: US 8,596,655 B2
(45) Date of Patent: Dec. 3, 2013

(54) PARTS SECURING MECHANISM AND METHOD THEREOF

(75) Inventors: Martin Belanger, Montreal (CA); Yves Martin, Kingsey Falls (CA); Mathieu Boivin, Montréal (CA); Martin Gauthier, St-Hippolyte (CA)

(73) Assignee: Norduyn Inc., Montreal (CA)

( * ) Notice: Subject to any disclaimer, the term of this patent is extended or adjusted under 35 U.S.C. 154(b) by 197 days.

(21) Appl. No.: 13/084,713

(22) Filed: Apr. 12, 2011

(65) Prior Publication Data
US 2011/0248458 A1    Oct. 13, 2011

Related U.S. Application Data

(60) Provisional application No. 61/323,665, filed on Apr. 13, 2010, provisional application No. 61/410,317, filed on Nov. 4, 2010.

(51) Int. Cl.
*B62B 3/00* (2006.01)
*B62B 3/06* (2006.01)

(52) U.S. Cl.
USPC ........... 280/47.35; 428/100; 428/137; 156/92

(58) Field of Classification Search
USPC ......... 280/47.34, 47.35; 156/92; 428/99, 100, 428/131, 137
See application file for complete search history.

(56) References Cited

U.S. PATENT DOCUMENTS

RE30,623 E    5/1981  Schulz
(Continued)

FOREIGN PATENT DOCUMENTS

EP    0080313    6/1983
EP    0922413    6/1999
(Continued)

OTHER PUBLICATIONS

Patent Cooperation Treaty, PCT International Search Report, Jul. 12, 2009, 3 pages, PCT/CA2009/001771.
(Continued)

*Primary Examiner* — John Walters
*Assistant Examiner* — Brian Swenson
(74) *Attorney, Agent, or Firm* — Mathieu Audet

(57) ABSTRACT

Is hereby provided a method of securing a plastic part to a composite structure, the method comprising providing a composite structure, performing at least one hole in the composite structure, providing a plastic part including a surface and at least one pin extending therefrom, the at least one pin being sized and designed to mate with the at least one hole to create a clamping force capable of temporarily securing the plastic part to the composite structure, applying bonding material between the surface and the composite structure to bond the surface to the composite structure, engaging the at least one pin with the corresponding at least one hole and adding pressure to engage the at least one pin with the corresponding at least one hole and spreading the bonding material between the plastic part and the composite structure, and curing the bonding material to permanently secure the additional part to the composite structure. A plastic part adapted to be secured to a composite structure with pins thereof and a composite materials galley cart comprising parts secured thereof with pins are also hereby provided.

17 Claims, 36 Drawing Sheets

(56) References Cited

U.S. PATENT DOCUMENTS

| | | | |
|---|---|---|---|
| 5,028,761 A | 7/1991 | Oda | |
| 5,769,442 A * | 6/1998 | Robinson et al. | 280/281.1 |
| 6,034,355 A | 3/2000 | Naderi | |
| 6,035,598 A * | 3/2000 | Sukolics et al. | 52/506.08 |
| 6,106,084 A | 8/2000 | Thogersen | |
| 6,234,498 B1 | 5/2001 | Saku | |
| 6,359,268 B1 * | 3/2002 | Walter | 219/622 |
| 6,425,649 B2 | 7/2002 | Kasuya | |
| 6,460,952 B1 | 10/2002 | Tryon | |
| 6,474,677 B2 | 11/2002 | Kasuya | |
| 7,044,335 B2 | 5/2006 | Aguirre | |
| 7,287,820 B2 | 10/2007 | Van Loon | |
| 7,544,915 B2 | 6/2009 | Hu | |
| 7,661,459 B2 | 2/2010 | Wesley | |
| 8,181,327 B2 * | 5/2012 | Apfel | 29/458 |
| 2001/0010419 A1 | 8/2001 | Kasuya | |
| 2005/0193760 A1 | 9/2005 | Moran | |
| 2005/0244215 A1 | 11/2005 | Prat | |
| 2005/0285360 A1 | 12/2005 | Helin | |
| 2006/0055290 A1 | 3/2006 | Schalla | |
| 2006/0070814 A1 | 4/2006 | Hu | |
| 2006/0108757 A1 | 5/2006 | Brookmire | |
| 2008/0116773 A1 | 5/2008 | Van Loon | |
| 2008/0136299 A1 | 6/2008 | Peurifoy | |
| 2010/0090429 A1 | 4/2010 | Hartmann | |
| 2010/0129184 A1 | 5/2010 | Thogersen | |
| 2010/0140890 A1 | 6/2010 | Boivin | |
| 2011/0025006 A1 | 2/2011 | Knoppers | |

FOREIGN PATENT DOCUMENTS

| | | |
|---|---|---|
| EP | 0922414 | 6/1999 |
| EP | 0922415 | 6/1999 |
| EP | 0922412 | 1/2002 |
| EP | 1308110 | 3/2007 |
| EP | 1542565 | 9/2007 |
| EP | 0046414 | 4/2011 |
| WO | 9101098 | 2/1991 |
| WO | 9701475 | 1/1997 |
| WO | 0021410 | 4/2000 |
| WO | 0021830 | 4/2000 |
| WO | 0219231 | 3/2002 |
| WO | 2004028301 | 4/2004 |
| WO | 2006093410 | 9/2006 |
| WO | 2008067428 | 6/2008 |
| WO | 2008070835 | 6/2008 |
| WO | 2009120067 | 10/2009 |
| WO | 2010084005 | 7/2010 |

OTHER PUBLICATIONS

Patent Cooperation Treaty, PCT Written Opinion of the International Searching Authority, Jul. 12, 2009, 5 pages, PCT/CA2009/001771.

Intellectual Property Office, Patents Act 1977: Search Report under Section 17, Aug. 9, 2011, Application No. GB1106180.1, 1 page.

* cited by examiner

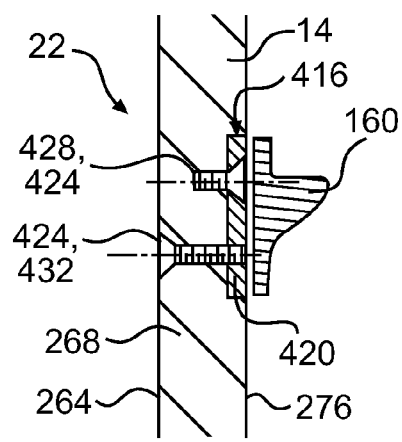
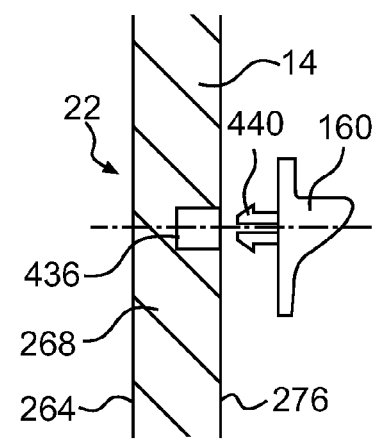
FIG. 20  FIG. 21
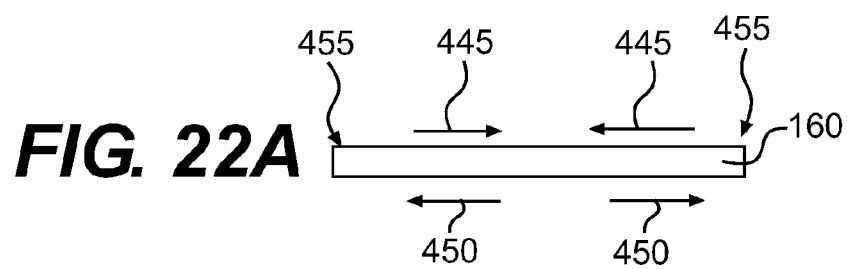
FIG. 22A
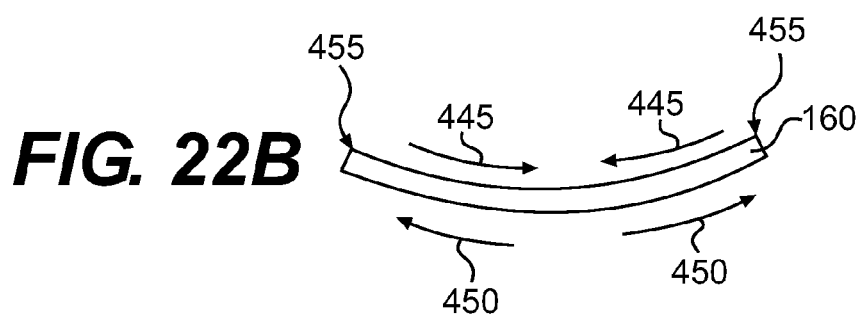
FIG. 22B

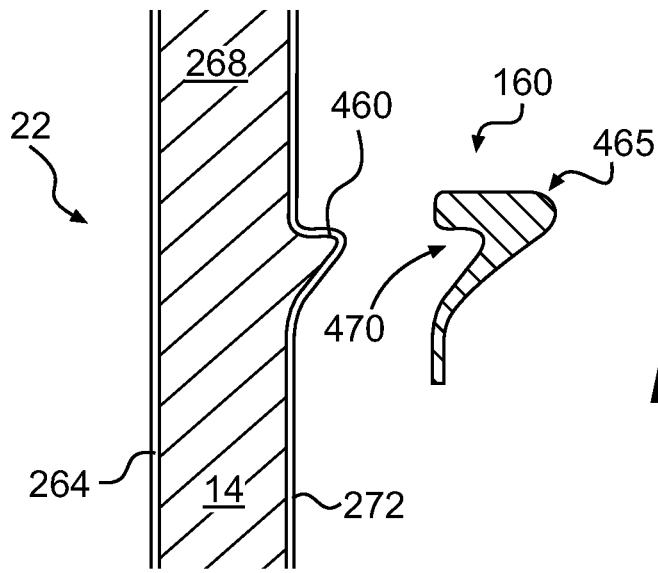
*FIG. 23*
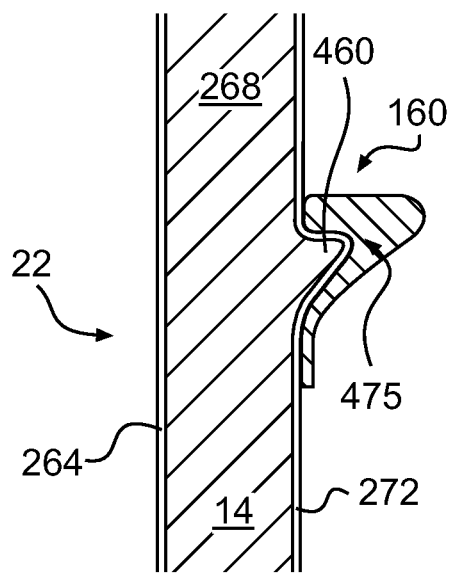 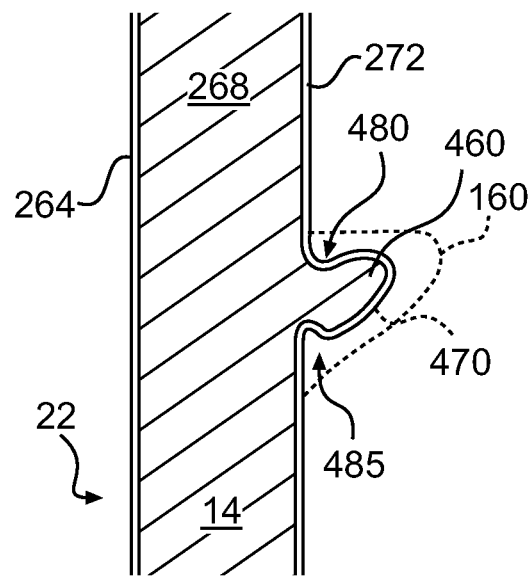
*FIG. 24*  *FIG. 25*

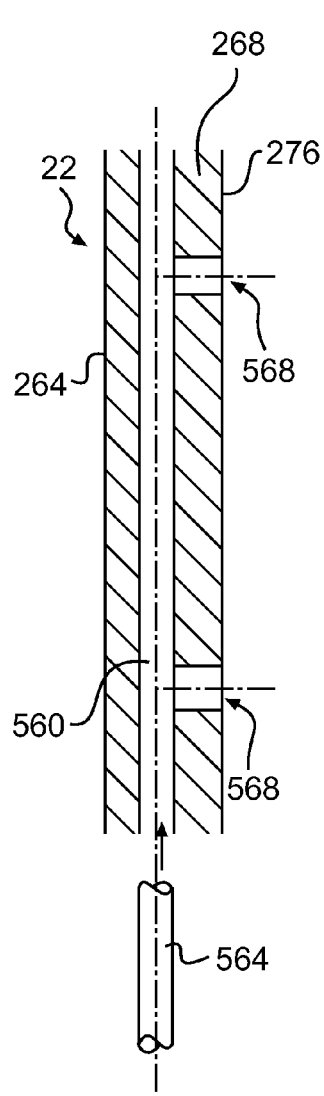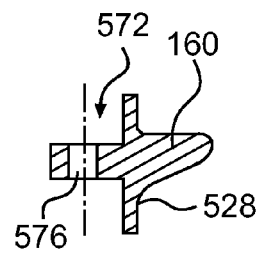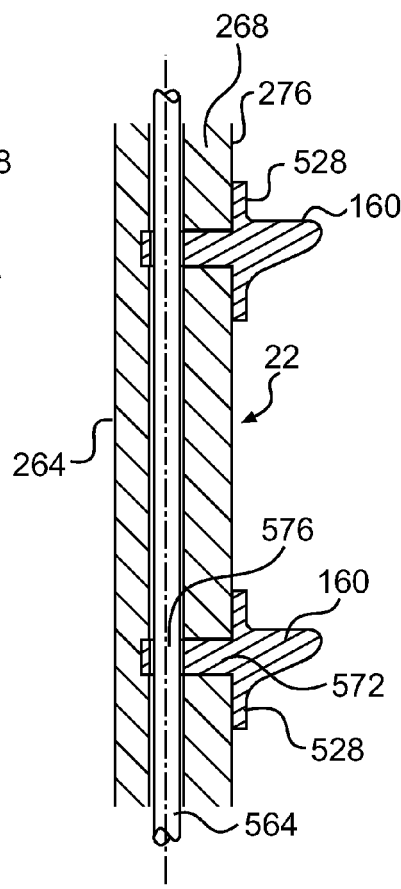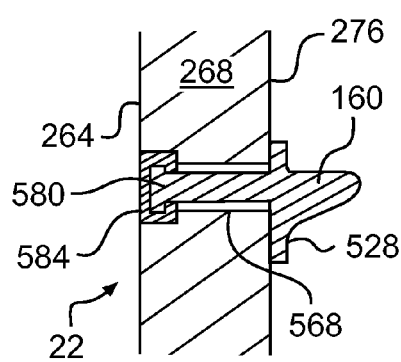
FIG. 35
FIG. 36
FIG. 37
FIG. 38

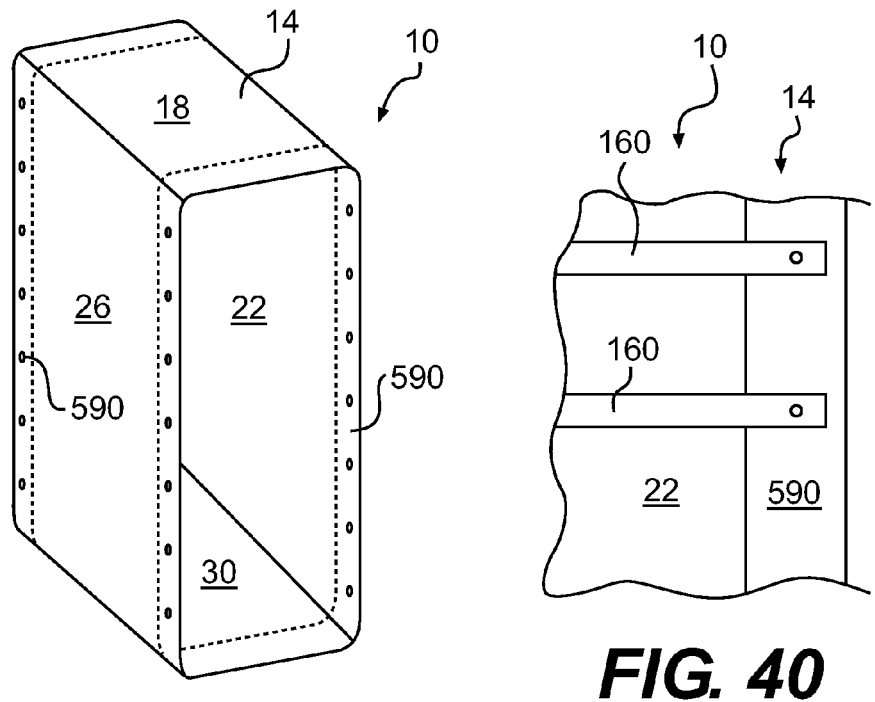
FIG. 39
FIG. 40
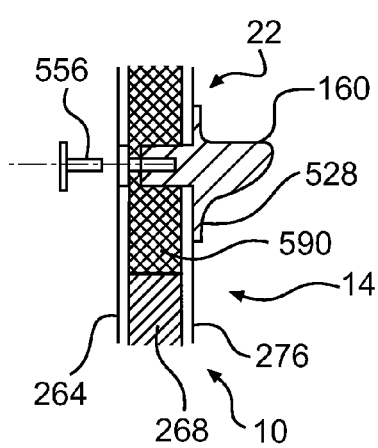
FIG. 41
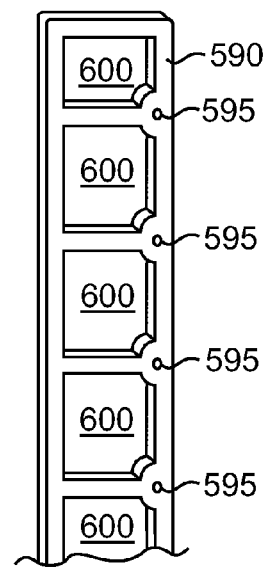
FIG. 42

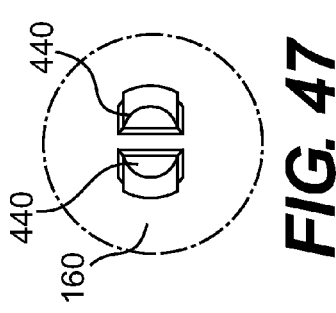
FIG. 47
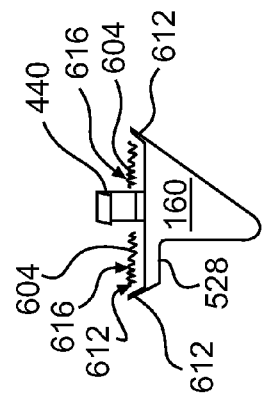
FIG. 48
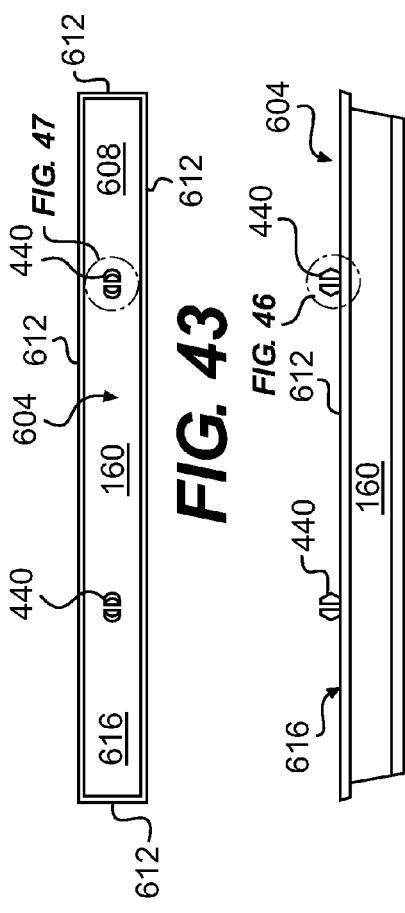
FIG. 43
FIG. 44
FIG. 45
FIG. 46

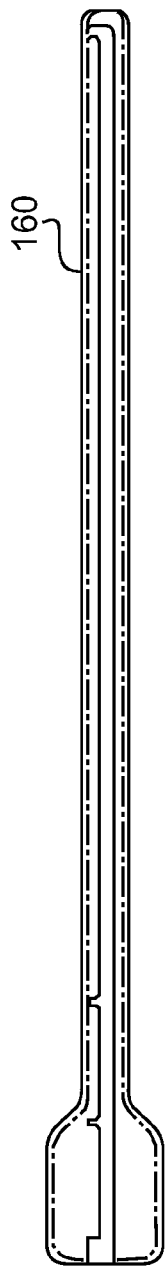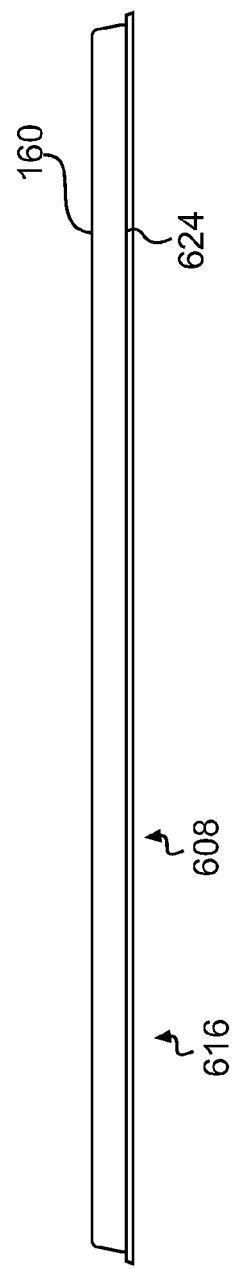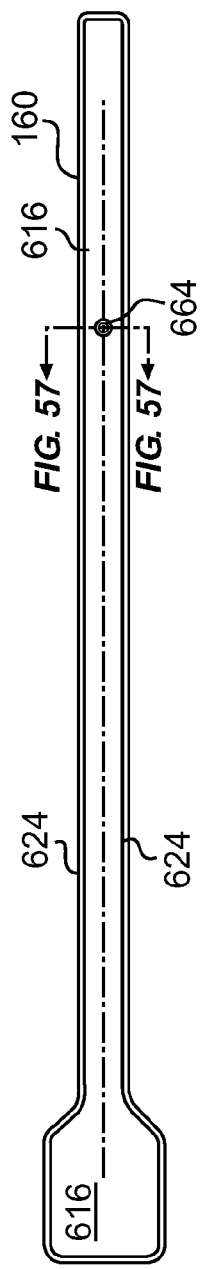
FIG. 56A
FIG. 56B
FIG. 56C

PARTS SECURING MECHANISM AND METHOD THEREOF

CROSS-REFERENCE

The present invention relates to and claims priority from U.S. Provisional Patent Application No. 61/323,665 filed Apr. 13, 2010, entitled UTILITY CART RAILS and from U.S. Provisional Patent Application No. 61/410,317 filed Nov. 4, 2010, entitled RAILS AND BUMPERS SECURING MECHANISM AND METHOD THEREOF, both documents are incorporated herein by reference.

FIELD OF THE INVENTION

This invention generally relates to a mechanism and a method of securing a part to a structural member. More precisely, the present invention relates to a mechanism and a method of securing parts, for example rails and/or bumpers, to a composite body.

BACKGROUND OF THE INVENTION

Joining parts together in an assembled product can represent an unexpected level of complexity. For instance, locating and securing a part to a composite materials structure raises some difficulties. Locating the part on the composite materials structure, applying bonding material, if required, and holding the part thereon can represent a significant challenge.

The challenge is even bigger if the process requires assembling simultaneously a plurality of parts. Repetitively performing the same assembly on an industrial scale while targeting minimum defects also increases the level of complexity. The method used to secure parts together should also be strong enough to provide sufficient adhesion thereof to sustain significant mechanical loads and also be subjected to repetitive load application cycles.

We will contextualize possible embodiments of the present invention throughout the present document by referring to a composite materials galley cart where rails, bumpers and frames, among other possible parts, must be secured to the composite materials base structure.

Galley carts are commonly used in the transport industry to perform different tasks. They must carry goods and be configured to serve drinks, food, sell goods and collect garbage, along galleys, among other tasks. Legacy galley carts are provided with an aluminum body that is rather heavy. Composites materials galley carts are becoming more attractive because, inter alia, of their lightweight although they sometimes increase the level of manufacturing complexity.

Some additional parts need to be secured to the composite body of the galley cart and bear some non-negligible mechanical stresses. For example, galley carts are generally provided with rails disposed on their internal proximal walls. These rails are used to receive bins or trays thereon. Trays have grooves defined therein, sized and designed to slideably engage a pair of corresponding opposed rails. It is possible to slide the tray in and out of the galley cart once a rail is properly inserted on each side of a tray.

A significant load can be transmitted to the rails by a tray supporting heavy goods therein. The load is even higher when the tray is pulled out of the galley cart in a cantilever position. The rails can be overloaded because of the extreme pressure provided by the tray used as a lever. It is possible that the extremities of the rails, that are sustaining the highest stresses, break, separate, delaminate the composite materials or disengage from the body of the galley cart. The load applied on the rails might also change the alignment of the rails.

Desirable methods of securing rails and bumpers on a composite materials galley cart should prevent delaminating the composite materials, creating openings where humidity can get inside the composite materials, in the foam core or honeycomb core and apply local stresses that are adverse to the inherent advantages provided by composite materials structures.

It is therefore desirable to find an improved securing mechanism and method of installing a part on a composite structure over the existing art. It is also desirable to have an efficient method of locating and holding plastic parts on a composite body. It is also desirable to design a rail and/or a bumper that can easily be positioned and more strongly secured to the wall of a composite materials galley cart.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, one object of the present invention improves at least some of the deficiencies associated with the drawbacks identified above.

The subject application relates to a method and parts thereof that facilitate the assembly of parts on a composite materials structure. The part can be a rail or a bumper secured to a composite materials wall of a galley cart.

The subject application relates to a variety of means to reduce the stress applied to a composite wall of a galley cart by a rail and/or a bumper attached thereto and adapted to support a slidable drawer.

The subject application relates to a rail that is mechanically positioned on the wall of the galley cart to allow curing of bonding material to permanently secure the rail to the galley cart.

The subject application relates to a composite materials wall comprising a series of locating holes adapted to receive an expandable fastener therein, the expandable fastener being adapted to mechanically locate and secure the rail to the composite material wall.

The subject application relates to a method of locating and securing a part on a composite body where holes are performed on the composite body, the holes are used to receive therein a pin or another fastener, a bonding material is added between the composite body and the part and also on and around the fastener to prevent any moisture or other undesirable dirt to get into the composite material via the holes when the fastener is engaged into its respective hole and, additionally, to chemically secure the part to the composite body.

The subject application relates to a composite materials wall comprising a series of holes adapted to receive respective fasteners therein to mechanically locate a part thereon with a bonding material added between the contacting surfaces to chemically secure the part to the composite wall and to further seal the composite material with the expandable fastener inserted therein.

The subject application relates to a composite materials wall comprising a hole therein adapted to receive respective expandable fasteners extending from a rear side of a rail and/or bumper to mechanically secure and position the rail and/or bumper on the composite materials wall and to keep a tension between the rail and/or bumper and the composite material wall for the time required for a bonding material to cure and permanently secure the rail and/or bumper to the composite materials wall.

The subject application relates to a rail and/or bumper provided with retaining ribs adapted to define a recessed portion configured to house glue or resin therein; the ribs ensuring a distance between the rear side of the rail and/or bumper and the composite material wall on which the rail and/or bumper is to be secured thereto.

The subject application relates to a composite materials wall comprising a series of holes adapted to receive therein respective expandable fasteners for locating the rail and/or bumper on the composite material wall and also to maintain and pre-strain the rail and/or bumper to the composite material wall for curing glue or resin applied therebetween.

The subject application relates to retaining ribs disposed on a rear surface of a rail and/or bumper to receive glue and/or resin therein, the height of the ribs being adjusted to retain a predetermined amount of glue and/or resin.

The subject application relates to a spacing rib or stem to set a distance between a part and a composite panel to define a volume adapted to receive therein a predetermined quantity of glue between the part and the composite panel.

The subject application relates to a rail and/or bumper member including retaining ribs disposed on a rail and/or bumper and provided with a proximal opposed angled portion sized and designed to facilitate the removal of a portion of a mold by pulling on the rail and/or bumper from the mold.

The subject application relates to a rail and/or bumper member including retaining positioning pins disposed on the rail and/or bumper and adapted to set a distance between the rail and/or bumper to define a volume adapted to receive a predetermined amount of glue and/or resin.

The subject application relates to a composite materials wall comprising an external recessed portion adapted to receive an insert therein, the insert being adapted to receive a protruding extension of the rail to mechanically secure the rail through the composite materials wall.

The present application relates to a method of securing a plastic part to a composite structure, the method comprising providing a composite structure, performing at least one hole in the composite structure, providing a plastic part including a surface and at least one pin extending therefrom, the at least one pin being sized and designed to mate with the at least one hole to create a clamping force capable of temporarily securing the plastic part to the composite structure, applying bonding material between the surface and the composite structure to bond the surface to the composite structure, engaging the at least one pin with the corresponding at least one hole and adding pressure to insert the at least one pin with the corresponding at least one hole and spreading the bonding material between the plastic part and the composite structure, and curing the bonding material to permanently secure the additional part to the composite structure.

The present application relates to a plastic part adapted to be secured to a composite structure, the plastic part comprising a surface and at least one pin extending therefrom, the at least one pin being sized and designed to mate with a corresponding at least one hole provided in the composite structure to create a clamping force capable of temporarily securing the plastic part to the composite structure while bonding material between the surface and the composite structure cures to permanently bond the surface to the composite structure.

The present application relates to a composite material galley cart comprising a plurality of plastic rails therein for slideably supporting trays therein, the rail comprising a surface and at least one pin extending therefrom, the at least one pin being sized and designed to mate with a at least one hole provided in the composite material galley cart to create a clamping force capable of temporarily securing the plastic part to the composite material galley cart while bonding material between the surface and the composite material galley cart cures to permanently bond the surface to the composite material galley cart.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 20 is a schematic front elevational sectional view of a portion of composite wall member and a rail with a securing mechanism in accordance with an embodiment of the invention;

FIG. 21 is a schematic front elevational sectional view of a portion of composite wall member and a rail with a securing mechanism in accordance with an embodiment of the invention;

FIG. 22 is a schematic side elevational view of a pretensed rails in accordance with an embodiment of the invention;

FIG. 23 is a schematic front elevational sectional view of a portion of shaped composite wall member and a rail with a securing mechanism in accordance with an embodiment of the invention;

FIG. 24 is a schematic front elevational sectional view of a portion of a shaped composite wall member and a rail with a securing mechanism in accordance with an embodiment of the invention;

FIG. 25 is a schematic front elevational sectional view of a portion of shaped composite wall member and a rail with a securing mechanism in accordance with an embodiment of the invention;

FIG. 35 is a schematic front elevational sectional view of a portion of composite wall member having an opening therein and a rod sized and designed to fit the opening in accordance with an embodiment of the invention;

FIG. 36 is a schematic side elevational view of a galley cart with a securing mechanism extending from the back side of thereof in accordance with an embodiment of the invention;

FIG. 37 is a schematic front elevational sectional view of a portion of composite wall member and two rails with a securing mechanism in accordance with an embodiment of the invention;

FIG. 38 is a schematic front elevational sectional view of a portion of composite wall member and a rail with a securing mechanism in accordance with an embodiment of the invention;

FIG. 39 is an isometric schematic view of a composite materials galley cart body with reinforced extremities provided with holes therein in accordance with an embodiment of the invention;

FIG. 40 is a schematic magnified view of a junction of a rail with the reinforcement of FIG. 39 in accordance with an embodiment of the invention;

FIG. 41 is a schematic front elevational sectional view of a portion of composite wall member and a rail with a securing mechanism in accordance with an embodiment of the invention;

FIG. 42 is an isometric schematic view of a lightened reinforcement of FIG. 39 in accordance with an embodiment of the invention;

FIG. 43 is a schematic rear elevational view of a rail with expandable fasteners in accordance with an embodiment of the invention;

FIG. 44 is a schematic top plan view of the rail of FIG. 43 in accordance with an embodiment of the invention;

FIG. 45 is a schematic front elevational view of the rail of FIG. 43 in accordance with an embodiment of the invention;

FIG. 46 is a schematic front elevational view of the rail of FIG. 43 in accordance with an embodiment of the invention;

FIG. 47 is a schematic magnified view of a rear elevational view of a rail with an expandable fastener in accordance with an embodiment of the invention;

FIG. 48 is a schematic front elevational sectional view of a rail with a securing mechanism in accordance with an embodiment of the invention;

FIG. 56 depicts three views of a rail in accordance with an embodiment of the invention;

DESCRIPTION OF EMBODIMENT(S) OF THE INVENTION

Figure 1:
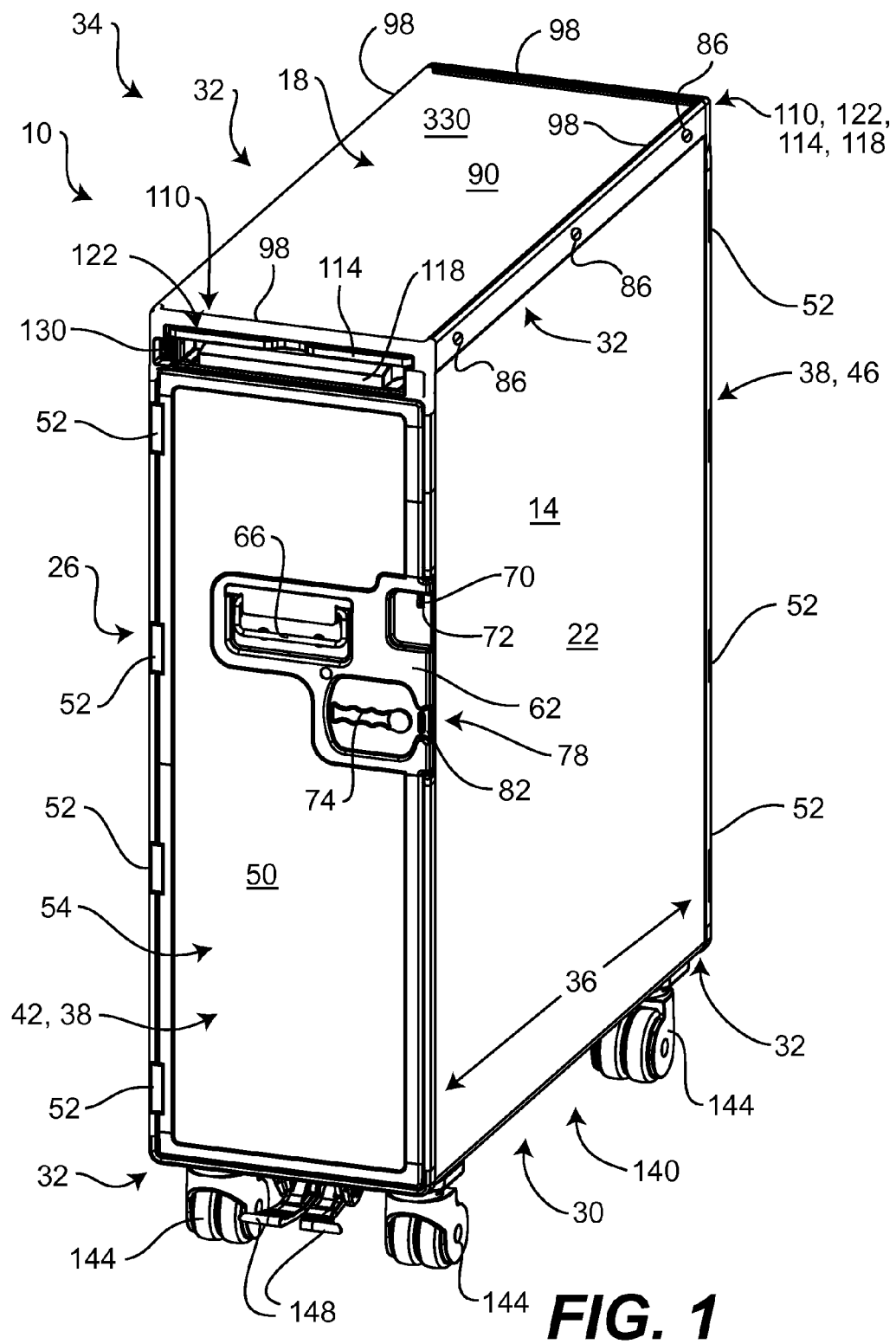
FIG. 1 is a perspective view of a full size galley cart in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in schematic form in order to facilitate describing the present invention.

A galley cart 10 adapted to carry goods is illustrated in FIG. 1 and used throughout the present specification to present a tangible exemplary use of embodiments of the invention. The present invention can therefore be used in conjunction with other goods and products. The utility galley cart 10 is adapted to be used in a passenger airplane. The utility galley cart 10 could alternatively be used in other environments like in a passenger train or, inter alia, in the medical field to distribute medicine or food. The galley cart 10 illustrated in FIG. 1 comprises a body 14 defining an upper portion 18, a right lateral portion 22, a left lateral portion 26 and a bottom portion 30. The body 14 of the utility galley cart 10 can be described as a monocoque construction 34 simultaneously providing the aesthetic envelope of the galley cart 10 and the structure providing its overall mechanical strength. In other words, the monocoque construction 34 provides an envelope that also serves as structural body 14 of the galley cart 10. As it will be described below in respect with at least one embodiment, the monocoque construction 34 can form a body 14 made of a single part.

In the illustrated embodiment, the upper portion 18, the right lateral wall portion 22, the left lateral wall portion 26 and the bottom wall portion 30 of the body 14 are connected together in a continuous wall. Illustrative embodiments described herein are using radius portions 32 to interconnect adjacent wall portions 18, 22, 26, 30. The body 14 of the illustrated embodiment forms a tubular member having four planar wall portions 18, 22, 26, 30 made of a single part. Wall portions 18, 22, 26, 30 can be secured together to form the body 14 in a first configuration while, alternatively, the four planar wall portions 18, 22, 26, 30 can be produced separately and later assembled in a unitary body 14 in a second configuration. Both configurations can be defined as forming a monocoque structure and can vary in terms of their overall shape.

It can be appreciated that the thickness of the wall portions 18, 22, 26, 30 can have different thicknesses adapted to sustain specific mechanical loads applied thereto. In other words, the monocoque construction 34 can be optimized to only use the required quantity of material at the right place and therefore reduce the weight of the galley cart 10 while providing the appropriate mechanical resistance thereof. For example, the upper portion 18 can have a thinner wall section than the bottom portion 30 because the upper portion 18 does not bear the weight of the entire galley cart 10 and its content. Additional details about the construction of the body 14 will be provided below.

Figure 4:
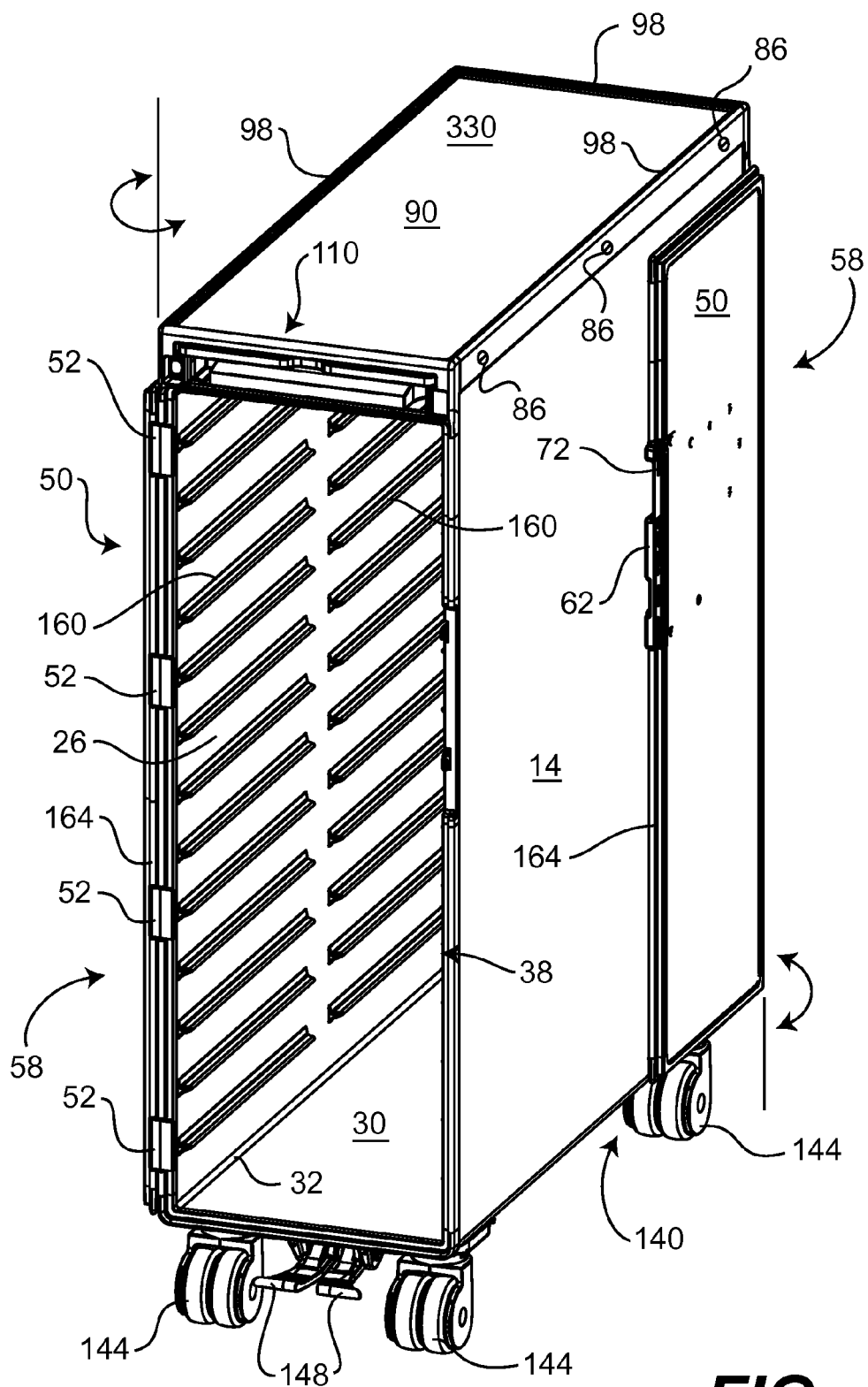
FIG. 4 is a perspective view of a full size galley cart with opened doors in accordance with an embodiment of the present invention.

More precisely, the galley cart 10 illustrated in FIG. 1 is a full-size galley cart 10 having a predetermined longitudinal length 36 and provided with a door opening 38 on each longitudinal side 42, 46. Each door 50 is hingedly 52 connected to body 14 and is adapted to pivot between a closed position 54, when mating with its respective door opening 38, and an opened position 58 as illustrated in FIG. 4. A reinforcement member 62 recessed into the door 50 provides support for a pull handle 66 pivotally secured thereon and adapted to open the door 50. A locking member 70 protruding from the door opening 38 and passing through a corresponding opening 72 in the door 50, when the door 50 is in the closed position 54, to receive a lock (not shown) thereon to prevent opening of the door 50 is also connected to the reinforcement member 62. A handle 74 is pivotally secured to the reinforcement member 62 to selectively disengage a retractable lock member 78 from a cooperating extending stem 82 to open the door 50. The handle 74 can be actuated in both the upward and downward directions to retract the lock member 78 to allow unlocking and opening of the door 50.

Still referring to FIG. 1, the galley cart 10 is provided with a cover element module 90 illustratively made of molded plastic or thermo-plastic material to cover the upper portion 18 of the body 14. The cover element module 90 is a portion of the galley cart 10 adapted to specialize the galley cart 10 for better assisting specific tasks while keeping the remaining portions of the galley cart 10 substantially unchanged. The cover element module 90 of the present embodiment can be permanently secured to the body 90 with glue, fasteners, or the like, to improve the shape of the upper portion 18 into a planar working area 94 defined by a peripheral ridge 98 configured to prevent objects or liquids to slide off the upper portion 18 of the body 14. Alternatively, the cover element module 90 is secured via a securing element 86.

Galley cart utility modules are portions of the galley cart 10 that can be changed for specializing the galley cart 10 without changing the body 14 of the galley cart 10. The modules can be located at various positions on the galley cart 10 despite the illustrative examples presented herein are mostly only using the upper portion 18 of the galley cart 10 to receive modules thereto. The modularity of the present invention can be directed to the galley cart 10 manufacturing process by selecting the desired module at the time of permanently assembling the galley cart 10 once the specific intended task of the galley cart 10 is known from the client. The modularity of the present invention can equally be directed to ongoing modifications to the galley cart 10 along its useful life by using non-permanent securing means to secure the module to the galley cart 10.

Continuing with FIG. 1, the bottom portion 30 rests on a wheelbase module 140 adapted to pivotally secure thereto four (4) sets of caster wheels 144. The wheelbase module 140 is permanently or removably secured to the bottom portion 30 of the body 14. Two pedals 148 are also pivotally secured to the wheelbase module 140 to selectively lock or unlock the caster wheels 144 to immobilize the galley cart 10 with an operative mechanism.

Figure 2:
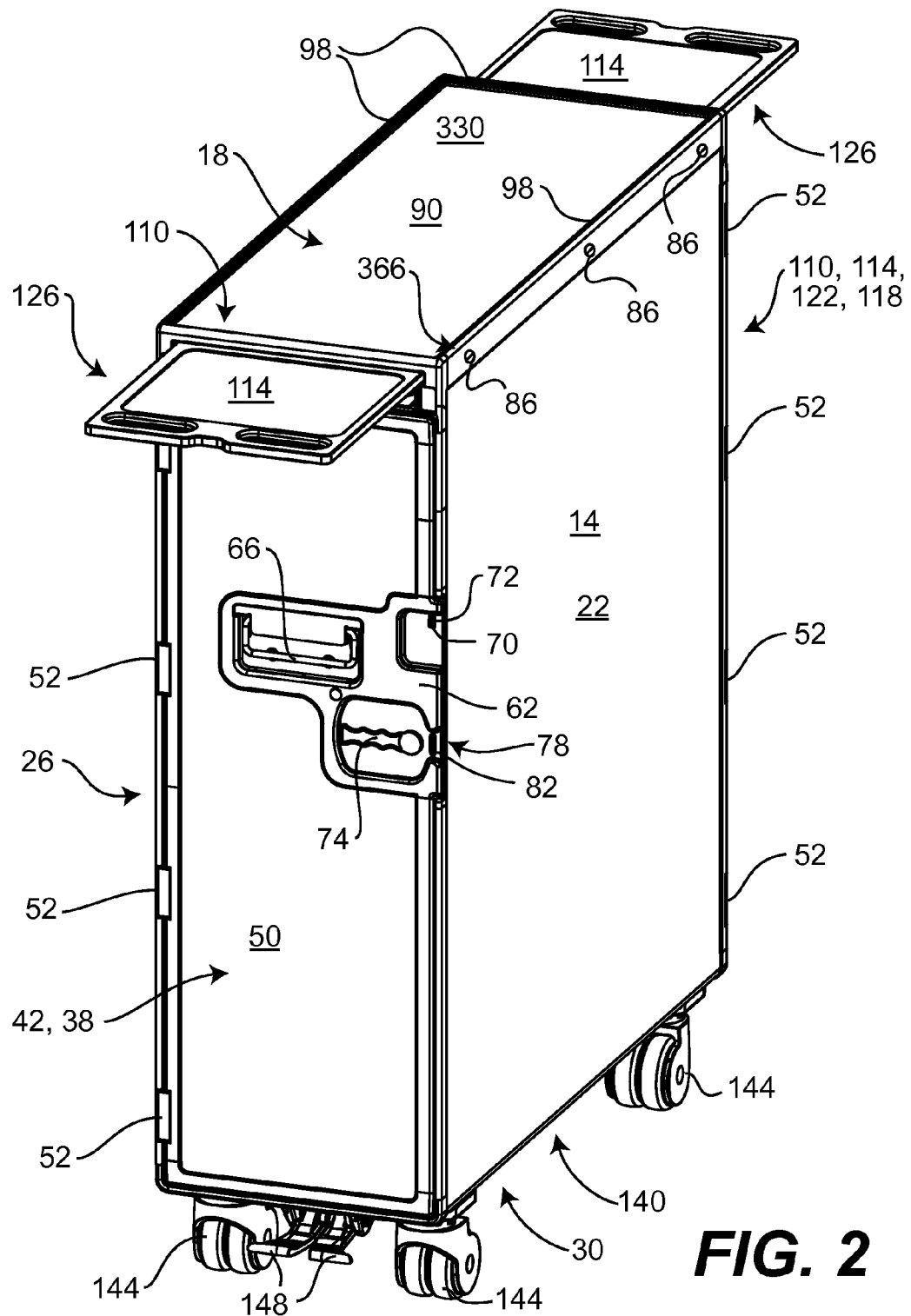
FIG. 2 is a perspective view of a full size galley cart in accordance with an embodiment of the present invention.

In the present embodiment, a tablet module 110 is secured inside the body 14, adjacent to the upper portion 18. The tablet module 110 of the illustrated embodiment comprises an extendable tablet 114 and an adjacent extendable receptacle 118. Dry ice (or means to cool) can be put in the extendable receptacle 118 to cool the interior of the galley cart 10. The extendable tablet 114 is moveable between a closed position 122 and an opened position 126 as it can better be appreciated in FIG. 1 and FIG. 2. A locking mechanism 130 actuated with a button in the present embodiment prevents the extendable receptacle 118 to extend when undesired. Two handles 134 are defined in the extendable tablet 114 and are accessible when the extendable tablet 114 is slightly extended to drive the galley cart 10, when desired.

Figure 3:
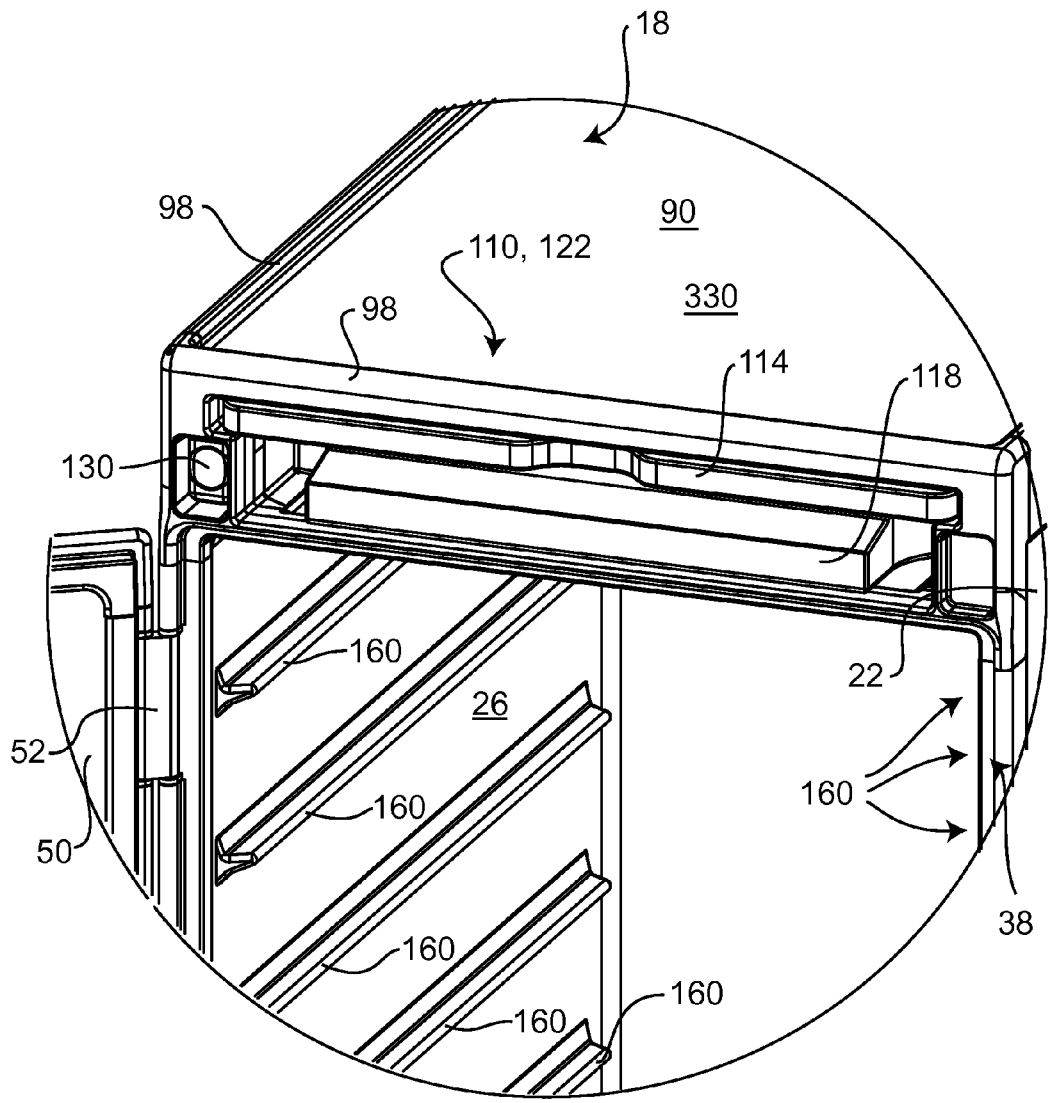
FIG. 3 is a magnified view of a tablet module of the galley cart of FIG. 1 in accordance with an embodiment of the present invention.

FIG. 3 is a magnified view of the tablet module 110. The semi-opened door 50 allows seeing the interior of the galley cart 10 where a series of receptacles-supporting parallel rails 160 are visible. The series of rails 160 are secured to the interior side of the lateral walls 22, 26 at a constant interval thereto to slideably receive receptacles, bins or drawers (not illustrated) thereon. Openings (not visible) disposed on the lower portion of the extendable receptacle 118 are allowing cold air to pass through the extendable receptacle 118 and propagate to the rest of the body 14 to cool goods located therein.

FIG. 4 illustrates the full size configuration galley cart 10 with the doors 50 in their respective opened position 58. Each door 50 can open 58 in a position parallel to an adjacent lateral wall 22, 26. For doing so, the hinge 52 is provided with a double pivot axis adapted to distance the side of the door 50 from the door opening 38 and allow parallel proximity with one of the lateral walls 22, 26. A magnet can be used to keep the door 50 temporarily affixed to its respective lateral wall 22, 26 in the open position 58.

Figure 5:
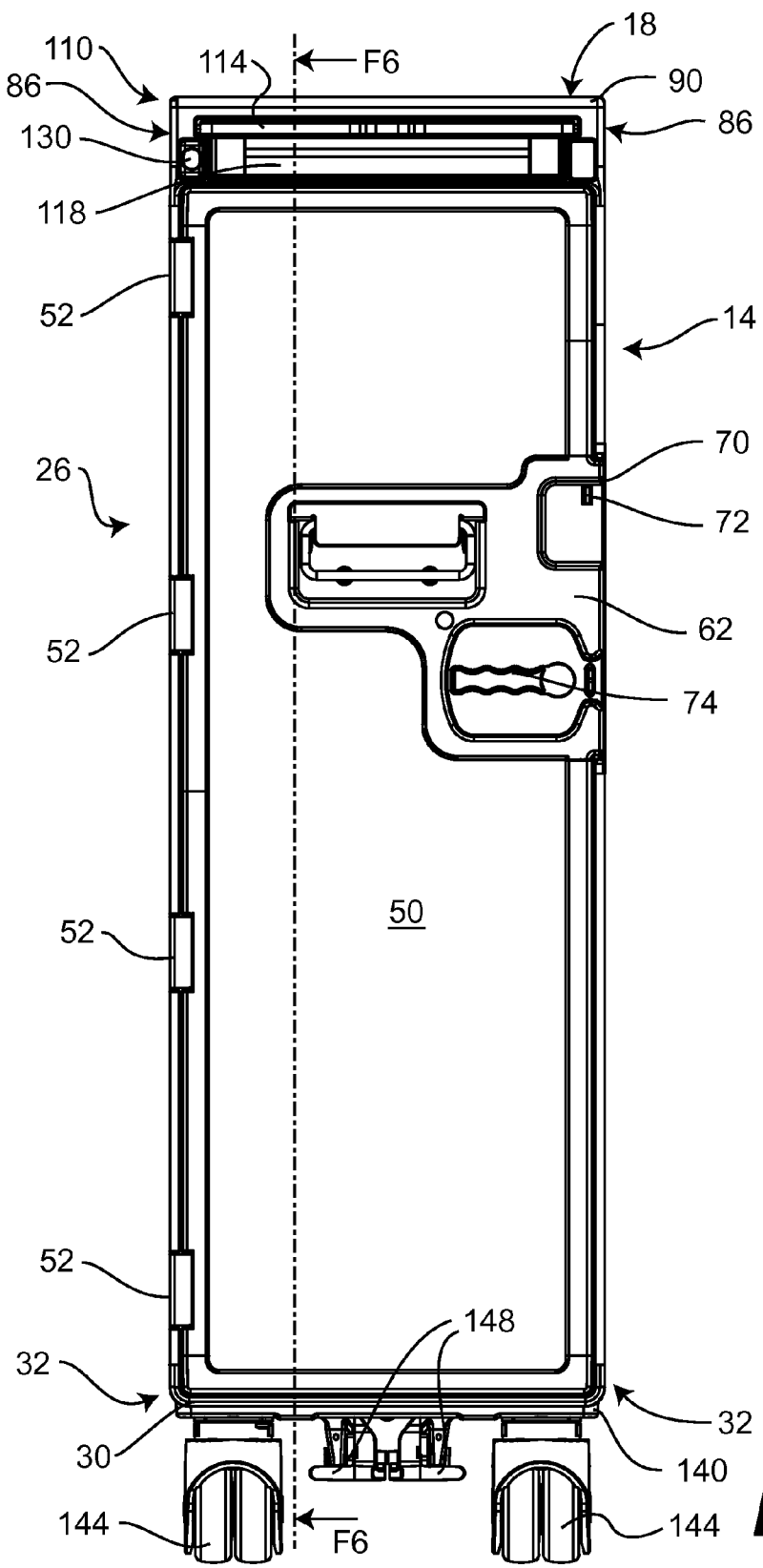
FIG. 5 is a front elevational view of the full size galley cart of FIG. 1 in accordance with an embodiment of the present invention.
Figure 6:
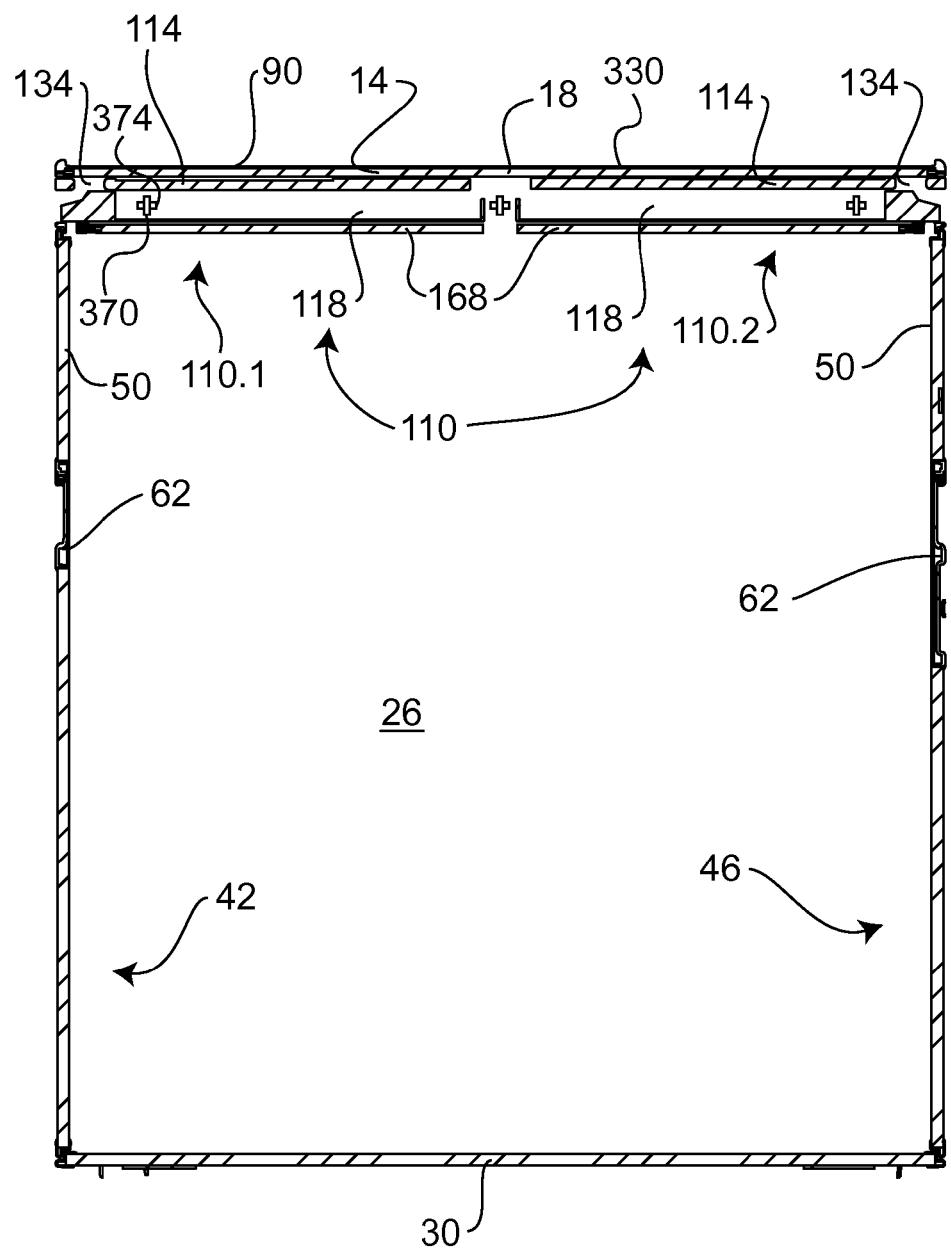
FIG. 6 is a right side elevational section view the full size galley cart of FIG. 1 in accordance with an embodiment of the present invention.

Turning now to FIG. 5 depicting the galley cart 10 and a section line representing the cut location of the section view illustrated in FIG. 6. FIG. 6 put further emphasis on the mechanical layout of the tablet module 110 inside the body 14. The full size galley cart 10 comprises two opposed tablet modules 110.1, 110.2. In other words there are two opposed extendable tablets 114 and two extendable receptacles 118 to respectively be used on each longitudinal side 42, 46 of the full size galley cart 10. Each tablet module 110 has a lower wall 168 sized and designed to be secured on each side to the lateral wall portions 22, 26. The tablet modules 110 of the present embodiment are located inside the body 14 of the galley cart 10 as opposed to the outside of the body 14. Alternatively, the tablet modules 110 could be located outside the body 14 on top of the upper portion 18 and covered by an appropriate cover element module 90.

Figure 7:
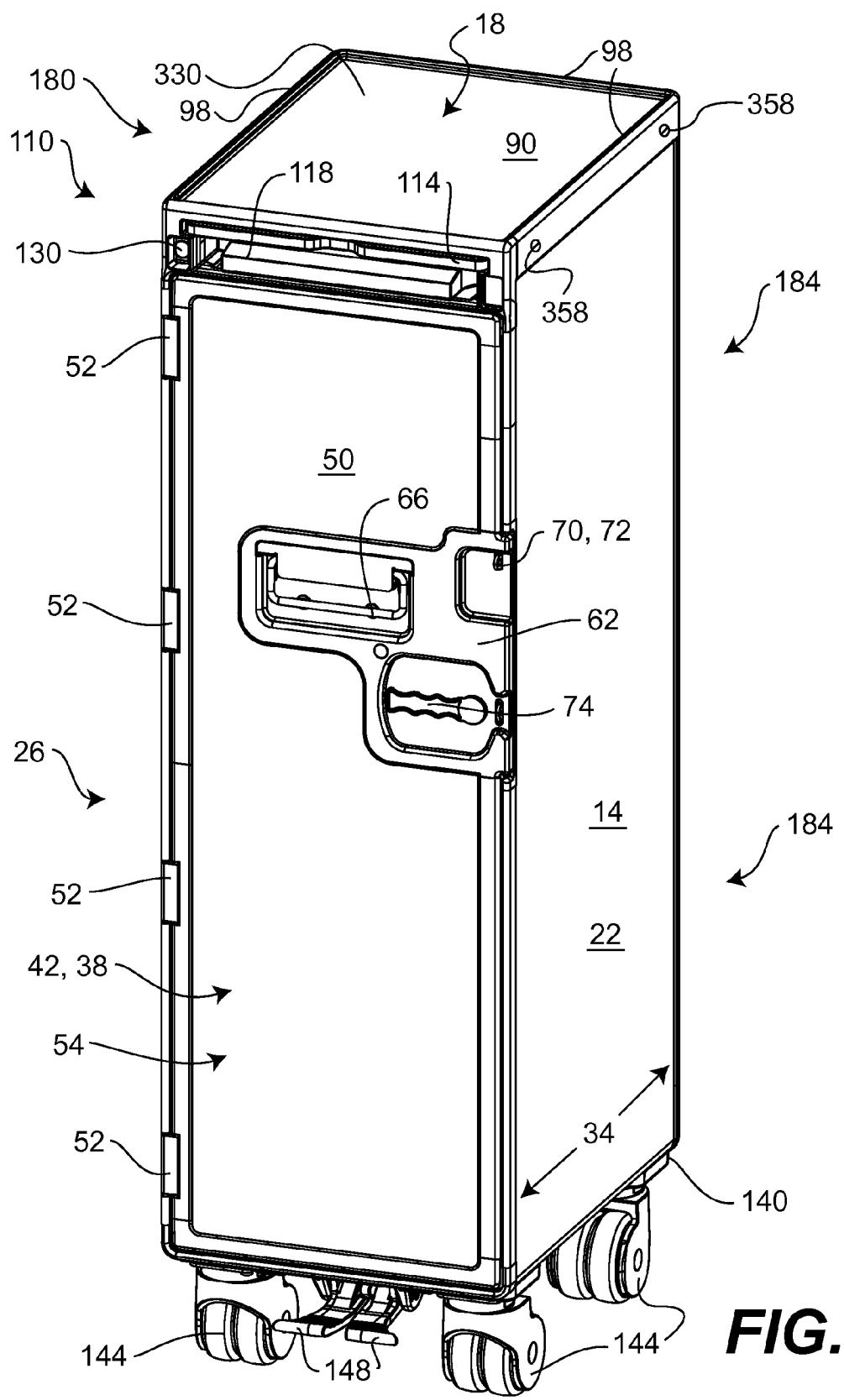
FIG. 7 is a perspective view of a half size galley cart in accordance with an embodiment of the present invention.

The full size galley cart 10 illustrated in FIG. 1 has a smaller counterpart. A half size galley cart 180, as illustrated in FIG. 7, has a smaller size due to its shorter longitudinal length 36. The smaller volume of the half size galley cart 180 can contain fewer goods therein but allows more nimble movements. We refer herein to a half size galley cart although it could not exactly be half the size of its larger counterpart.

Figure 8:
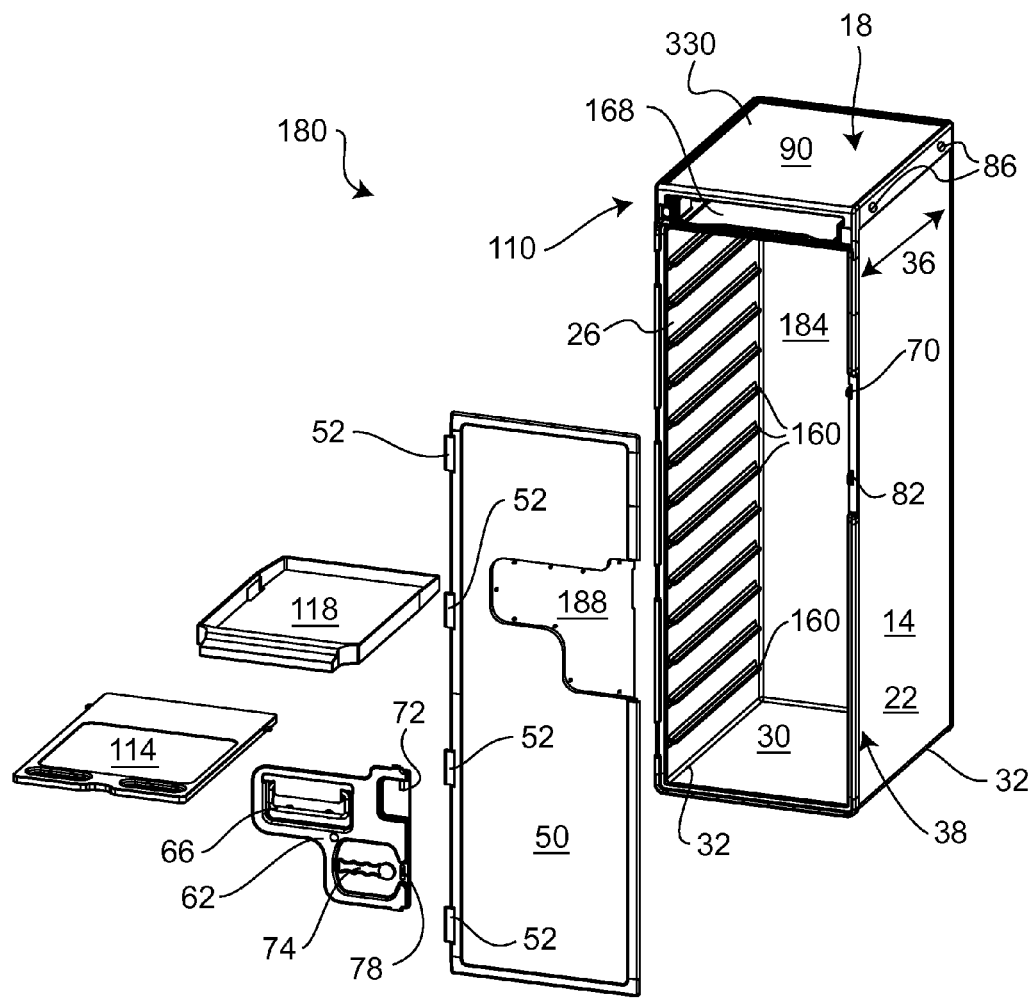
FIG. 8 is an exploded perspective view of a half size galley cart in accordance with an embodiment of the present invention.

As it is called, the half size galley cart 180 of the present embodiment is about half the length of the full size galley cart 10. This is mainly obtained by reducing the longitudinal length 36 of the body 14 and the cover element module 90 and by using a single tablet module 110, a single door 50 and closing the opposite longitudinal side with a back portion 184 that can better be appreciated in exploded FIG. 8. Beside the shorter longitudinal length 36, the components of the half size trolley 180 are substantially similar as the components of the full size trolley 10. It can further be seen in FIG. 8 that the door 50 has a recessed portion 188 sized and designed to receive therein the lock member 62 such that the lock member 62 and the locking components located thereon do not significantly extend over the external surface of the door 50.

Figure 9:
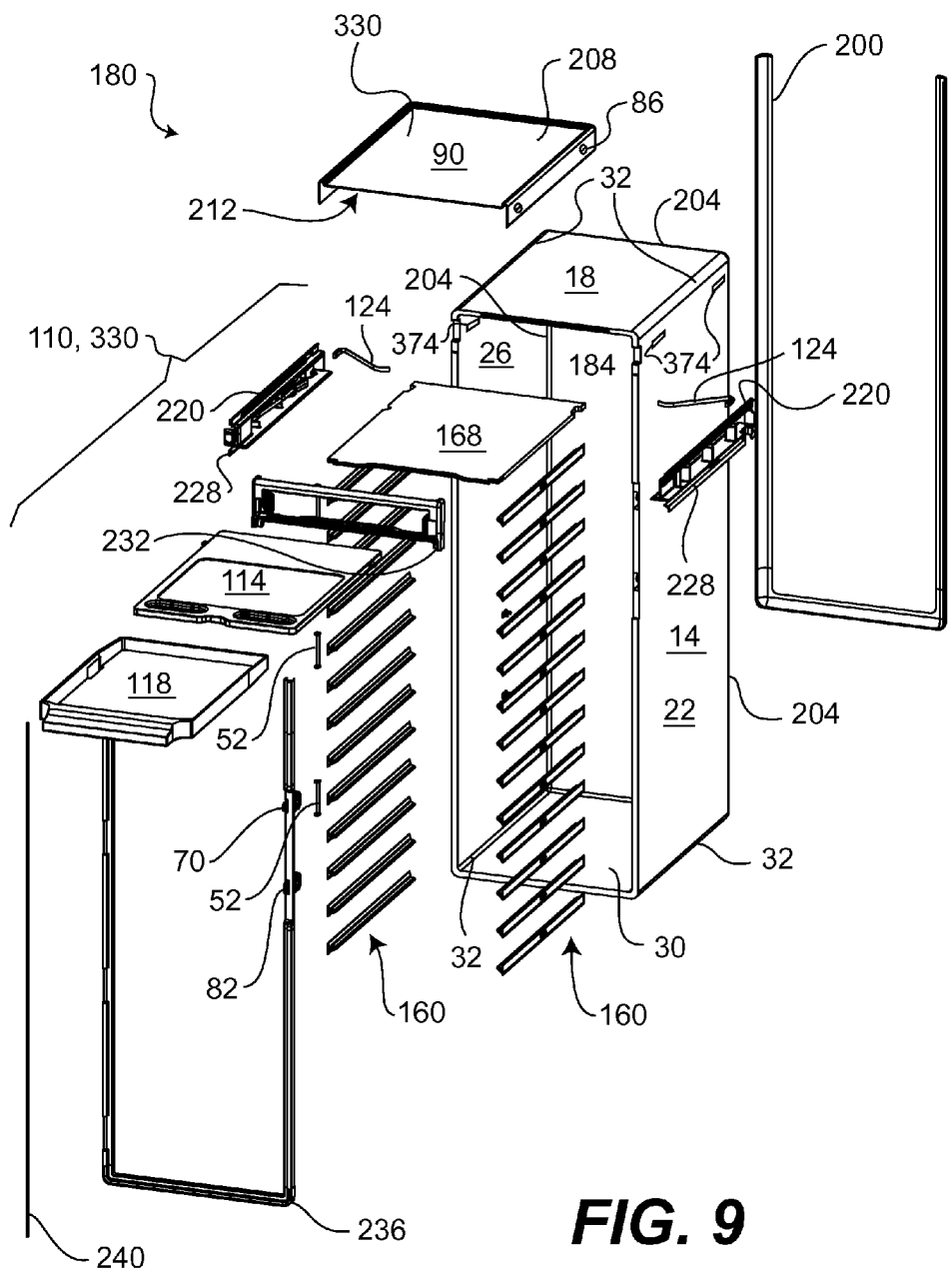
FIG. 9 is an exploded perspective view of a half size galley cart in accordance with an embodiment of the present invention.

FIG. 9 illustrates the half size galley cart 180 in a more detailed exploded view. Many parts are secured to the composite materials body 14 of the galley cart 180. These parts are preferably secured with securing mechanisms discussed in more details below. Beginning from the back of the galley cart 180 it can be appreciated there is a resilient member 200 illustratively adapted to cover the rear edges 204 of the body 14. The resilient member 200 is preferably made of a material capable of absorbing shocks, like rubber or plastic. Additional resilient members can be added on other portions of the galley cart 180 where needed to protect the body 14, or other parts of the galley cart 180, against exterior objects that could damage the galley cart 180. The parts are affixed to a half size galley cart 180 in the present embodiment but could also be affixed to the full size galley cart 10 without departing from the scope of the present invention.

The cover element module 90 used on a half size galley cart 180 is obviously smaller than the cover element module 90 adapted to be used in conjunction with a full size galley cart 10 as illustrated in FIG. 1. As previously mentioned, the cover element module 90 is preferably made of thermoformable or thermoset polymeric material because it is easy to shape, its low cost, its light weight and the optional additional desirable features that could be added (i.e. ridges, grooves, logos ... ) thereon. Anti-slip texture can be added on the upper surface 208 of the cover element to prevent objects to slip thereon, to help liquid to drain or to prevent undesired noise to be produced when objects are put thereon. Similarly, a texture could be added on the lower surface 212 to improve adhesion between the cover element module 90, the upper portion 18 and the side portions 22, 26 of the body 14. This might be desirable when the cover element module 90 is glued to the body 14.

Still in FIG. 9, the tablet module 110 is extracted from the interior of the body 14. The extendable tablet 114 and the extendable receptacle 118 are dismantled from the side guides 220 in which they operatively slide between their respective extended and retracted positions. The extendable tablet 114 and/or the extendable receptacle 118 are optionally spring loaded with spring blades 124 located at the rear of the tablet module 110 to facilitate their extensions when they are fully retracted in the body 14. A connection between one end 224 of the spring blade 124 and its related side guide 220 locates the spring 124 in a position where the spring blade 124 stores energy therein when the extendable tablet 114 and/or the extendable receptacle 118 are retracted in the body 14. The energy stored in the spring blade 124 is restored when the locking mechanism unlocks the extendable tablet 114 and/or the extendable receptacle 118 from its recessed position to push the tablet 114 or the receptacle 118 out. Additional springs 124 associated with the tablet module 110 to preload an additional extendable tablet 114 and/or an additional extendable receptacle 118 are alternatively provided. Each side guide 220 is secured to the interior wall surface of the body 14 at the appropriate height.

The side guides 220 of an embodiment of the present invention can be glued or secured otherwise to the body 14, using or not, an intervening part 228. The present embodiment uses a pair of intervening parts 228 to interface between respective side guides 220 and the body 14. These additional intervening parts 228 are desirable to better locate the side guides 220 before mounting the whole tablet module 110 in the body 14 as opposed to trying to secure the complete tablet module 110 in the body 14. This is very convenient, when the tablet module 110 is glued to the body 14, to glue the intervening parts 228 to the body 14 and maintains it with a jig, wait for the glue to cure and then secure the remaining parts of the tablet module 110 to the body 14. The side guides 220 are also useful to removably secure the tablet module 110 or another module thereon. Another embodiment of the invention uses fasteners to secure the side guides 220 to the body 14 therefore allowing the side guides 220 to be removed if needed. Some means to secure parts to a composite body 14 are detailed below. An alternate embodiment of the invention provides a removable securing mechanism allowing easy and quick removal of the side guides 220 to install some other desirable features that are useful when the galley cart 180 is in use for some tasks. A front panel 232 is located in front of the tablet module 110 and acts as a finishing element having an aesthetic value. In the present embodiment, the front panel defines an opening adapted to let the extendable tablet 114 and/or the extendable receptacle 118 pass through.

FIG. 9 also depicts a door-opening frame 236 having a profile adapted to mate with edges of the body 14 on one side and to receive the door 50, in the closed position 54, on the other side—not illustrated in FIG. 9 but illustrated in FIG. 1. The door-opening frame 236 is firmly anchored on the edge of the body 14 and could be secured in place with adhesive and/or a securing means illustrated below. In the illustrated embodiment the locking member 70 and the extending stem 82 are molded in the door-opening frame 236 to ensure sufficient stiffness and avoid transferring directly the load to the body 14. Alternatively, the locking member 70 and the extending stem 82 are glued to the door-opening frame 236. Another embodiment firmly secures the locking member 70 and the extending stem 82 to the body 14 with fasteners and extends through associated openings performed in the door-opening frame 236. Additionally, the door-opening frame 236 further defines a portion of the hinge 52 pivotally securing the door 50 to the body 14. A hinge pivot 240 can be seen in FIG. 9. The long hinge pivot 240 is inserted through alternate openings in the door-opening frame 236, the door 50 and the smaller hinge members associated with reference number 52 in FIG. 9.

Figure 10:
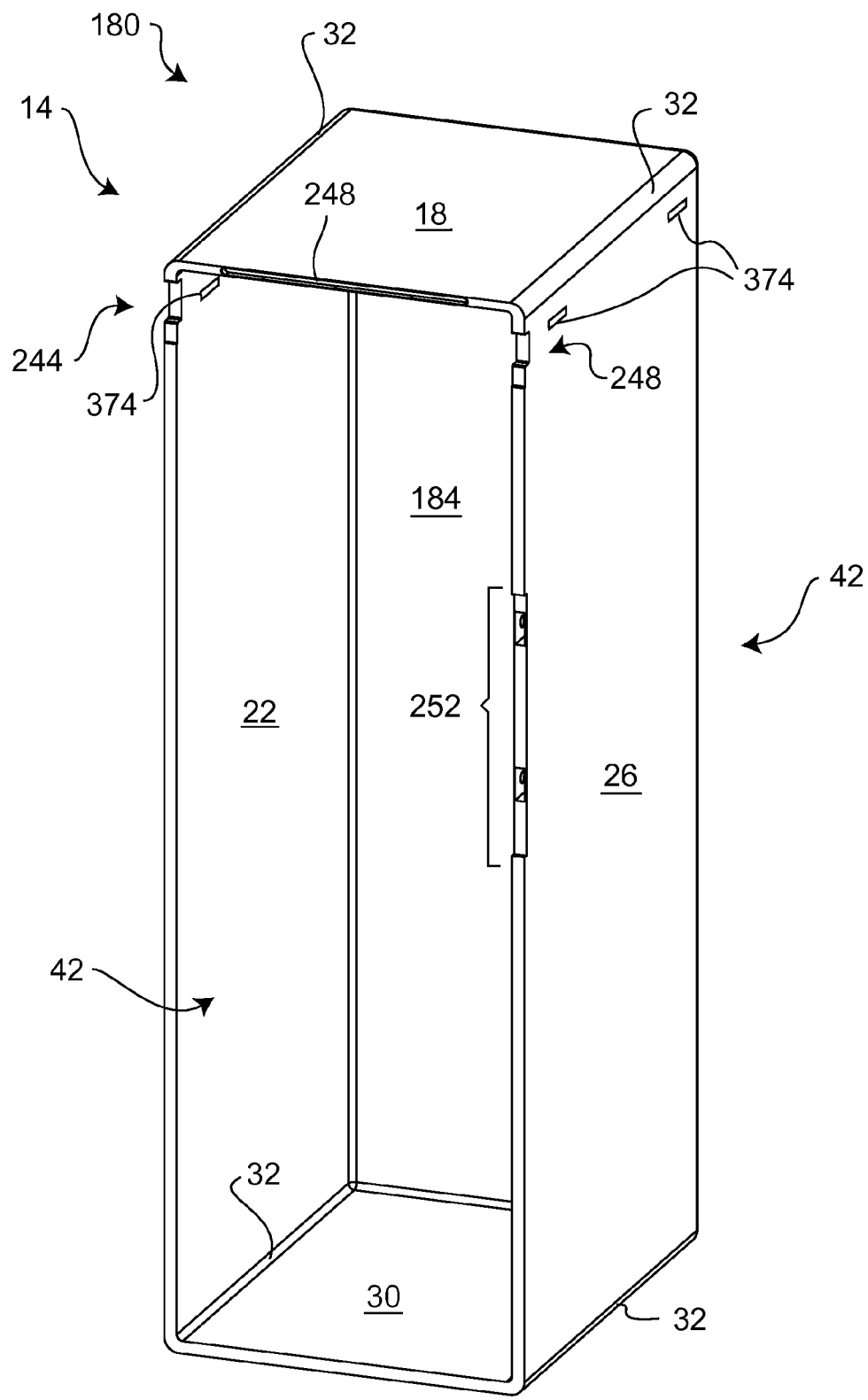
FIG. 10 is a perspective view of a body of a half size galley cart in accordance with an embodiment of the present invention.

Turning now to FIG. 10 illustrating solely a body 14 defining the aforementioned upper wall portion 18, right lateral wall portion 22, left lateral wall portion 26, bottom wall portion 30 and, because this is the body of a half size trolley 180, a back wall portion 184. In one embodiment, the upper wall portion 18, right lateral wall portion 22, left lateral wall portion 26 and bottom wall portion 30, interconnected with radius portions 32, are made of a single part and the back wall portion 184 is connected to the hollowed body 14 afterward. This allows the hollowed body 14 to have an extrusion-like shape before it is capped on one longitudinal side 42 to provide a half size galley cart body 14. Conversely, as explained above in reference with the full size galley cart 10, the upper wall portion 18, right lateral wall portion 22, left lateral wall portion 26 and bottom wall portion 30 interconnected with radius portions 32 are forming the body 14 of the full size galley cart 10.

The upper wall portion 18, right lateral wall portion 22, left lateral wall portion 26, bottom wall portion 30 are made of composite materials to provide a strong mechanical resistance yet light weight full size galley cart 10 and/or half size galley cart 180. Composite materials are commonly known as reinforcement fibers fixed with a resin matrix. The composite material is advantageous for its lightweight; its anisometric structural benefits and for its thermal efficiency, thus providing a good thermal barrier between the inside of the galley cart 10 and the environment.

The present application can utilize a liquid Phenolic resin to infuse dry fabrics (e.g. fibers, reinforcement material, . . . ) in the composite layup by means of vacuum infusion molding. This enables to reduce the costs of materials while still enabling to mold the composite sandwich layup in a shape of a finished trolley. Additionally, Phenolic resin meets the numerous safety requirements for aviation applications.

Vacuum Infusion Process (VIP) is a common resin infusion fabrication method usable with Phenolic resin that uses vacuum pressure to drive liquid resin into dry fiber-reinforcement material. Materials are laid up dry into the mold and the vacuum is applied before resin is introduced. Once a complete vacuum is achieved, resin is literally sucked into the laminate via carefully placed resin-feed lines. The resin infusion process has been identified as a cost-effective fabrication technique for producing damage tolerant textile composites. Dry textile preforms are resin impregnated, consolidated and cured in a single step eliminating costly prepreg tape manufacture and ply-by-ply layup. VIP uses vacuum bag that is not reusable. The bag is placed over the part and is sealed around the perimeter of the mold with tacky-tape. The layup of material in the VIP consists of fiberglass woven cloth layers; a foam core; Phenolic resin and vacuum bagging accessories.

Continuing with FIG. 10, the forward edge 244 of the body 14 is shaped 248 to accommodate the front panel, on its upper wall portion 18 and lateral wall portions 22, 26. Additional forms/shapes 252 are performed on the right lateral portion 26 to receive the locking member 70 and the extending stem 82 as taught in an embodiment of the invention. Other forms could be performed on the body 14 to suit various other needs without departing from the scope of the present invention.

Figure 11:
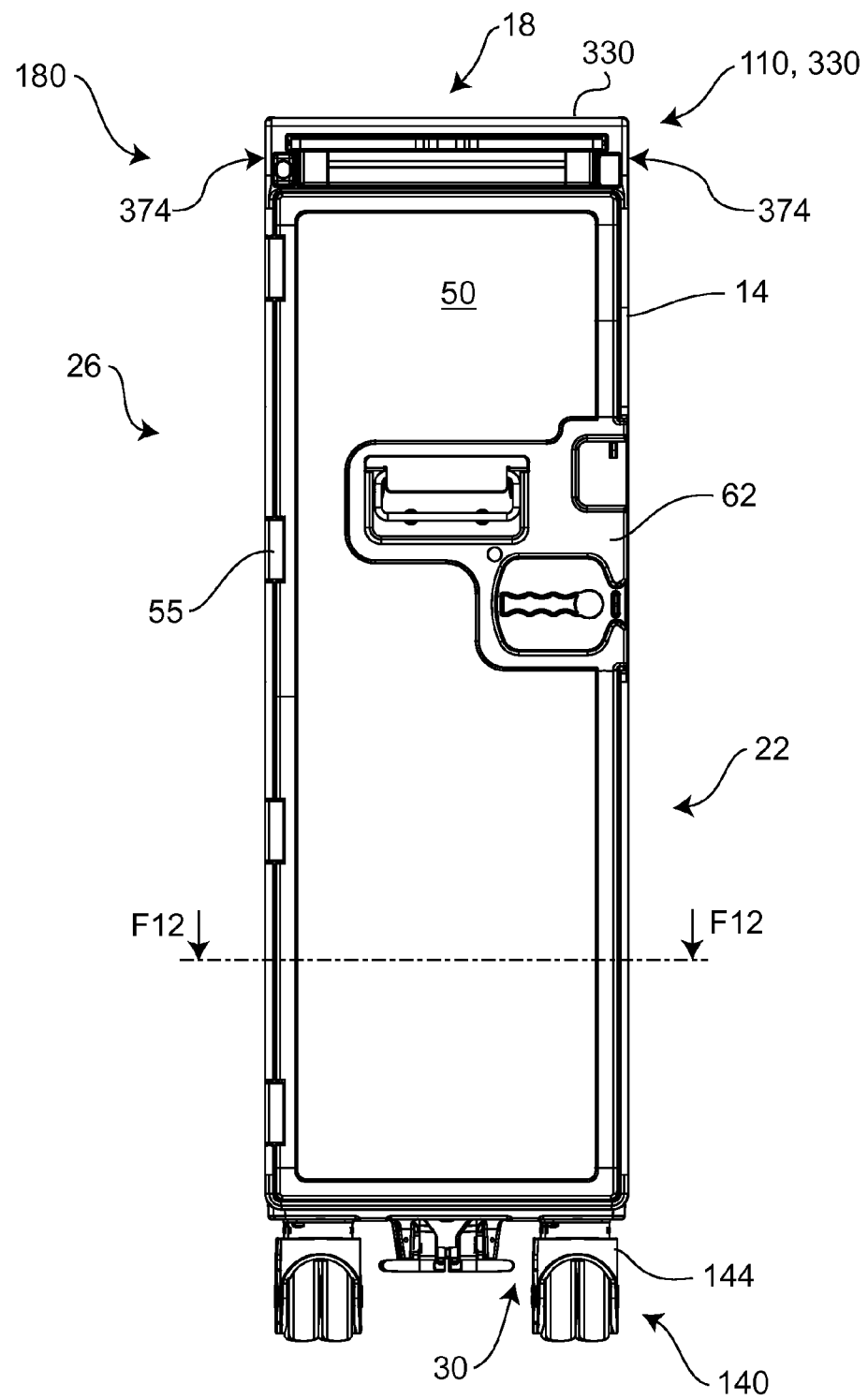
FIG. 11 is a front elevational view of a half size galley cart in accordance with an embodiment of the present invention.
Figure 12:
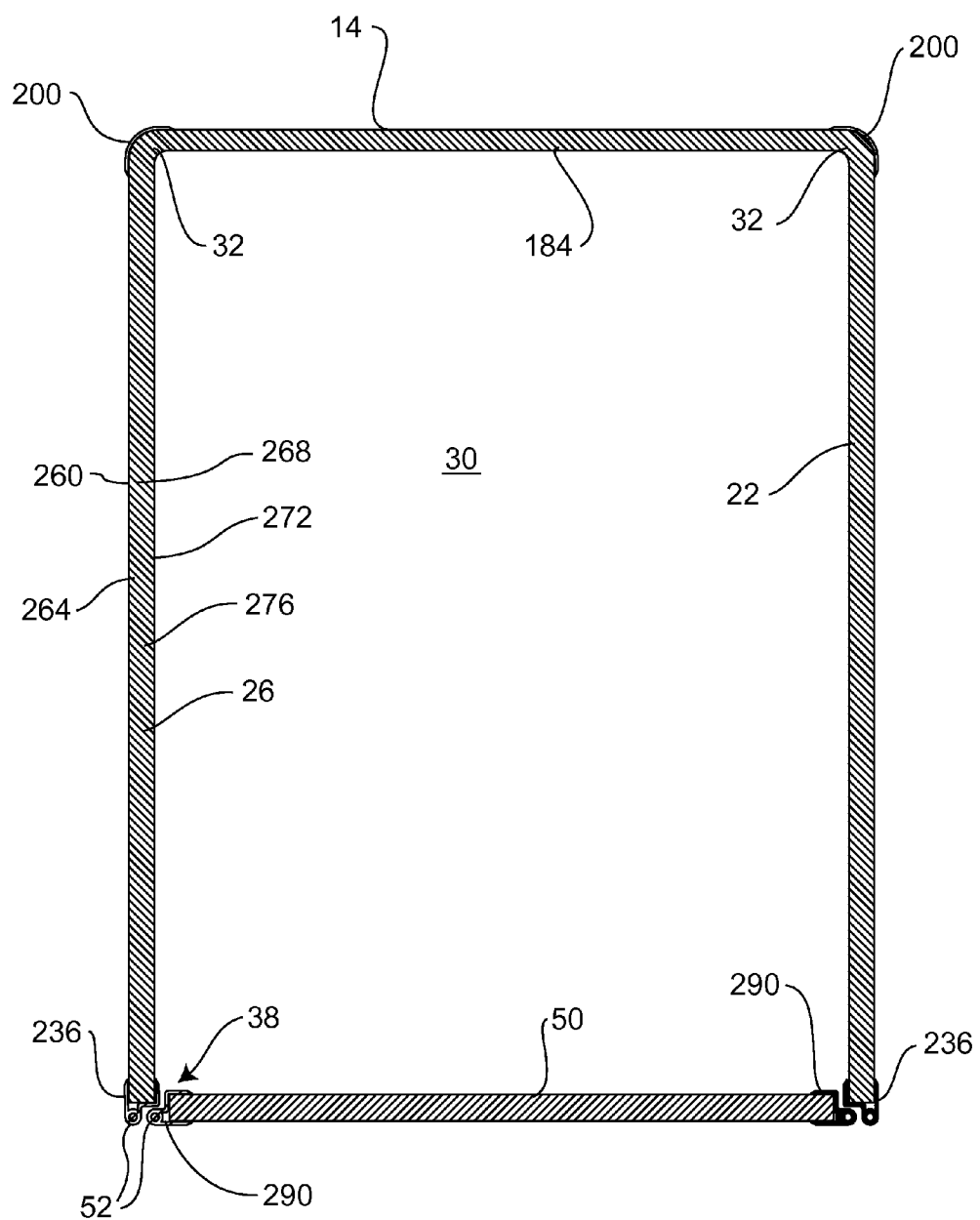
FIG. 12 is a sectional top plan view of a half size galley cart in accordance with an embodiment of the present invention.

FIG. 11 is an illustration of a half size galley cart 180 with an indication of the section area used by following FIG. 12 where it is possible to appreciate in more details the composition of the composite materials used in the galley cart body 14. This top plan view depicts the continuity between the left lateral wall portion 26, the back wall portion 184 and the right lateral wall portion 22. The radius portions 32 ensuring the composite wall continuity are well shown in FIG. 12 with their respective resilient member 200. The composite materials comprise, in an embodiment of the invention, a sandwich structure of an exterior finishing layer 260 used to protect the body 14 and improve its resistance to contacts with exterior objects while giving an alternate aesthetic finish to the body 14. An exterior layer 264 of fibers and Phenolic resin comes next with a central core 268 having the role of distancing the interior layer 272 of fibers and Phenolic resin from the center of the wall portion thus increasing the stiffness of the structure. An interior finishing layer 276 used to protect the body 14 and improve its resistance to contacts with interior objects.

Figure 13:
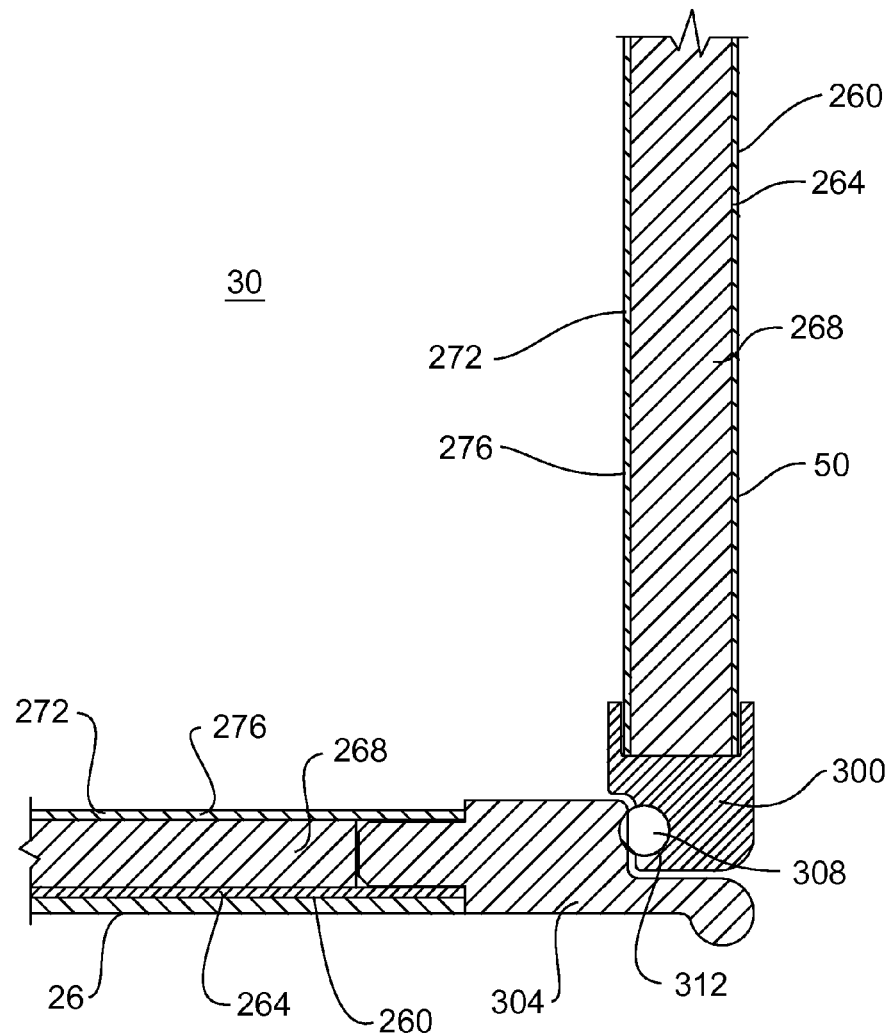
FIG. 13 is a sectional view of a portion of a door closure mechanism of a galley cart in accordance with an embodiment of the present invention.

Still in reference with FIG. 12, one can appreciate that the door opening frame 236 of the door opening 38 and the door contour frame 290 are made of the same extruded material. In this embodiment of the invention the same extruded shape is complementarily used for the door-opening frame 236 and the door contour frame 290. The use of a single extruded shape of this embodiment simplifies the assembly and reduces the tooling cost. The shape of the extrusion depicted in FIG. 12 and in FIG. 13 are possible designs. The extruded material is aluminum although other equally suitable material could be used and still be considered within the scope of the present invention (e.g. plastic).

An alternate embodiment of the interface between the door opening frame 236 and the door contour frame 290 is illustrated in FIG. 13. Two different shapes of extrusion 300, 304 are used in this embodiment and a seal 308 (an "O" ring) has been inserted in a groove 312 properly sized and designed. This type of design improves the sealing of the door 50 with the body 14 to help improve thermal efficiency of the galley cart 10, 180.

Figure 14:
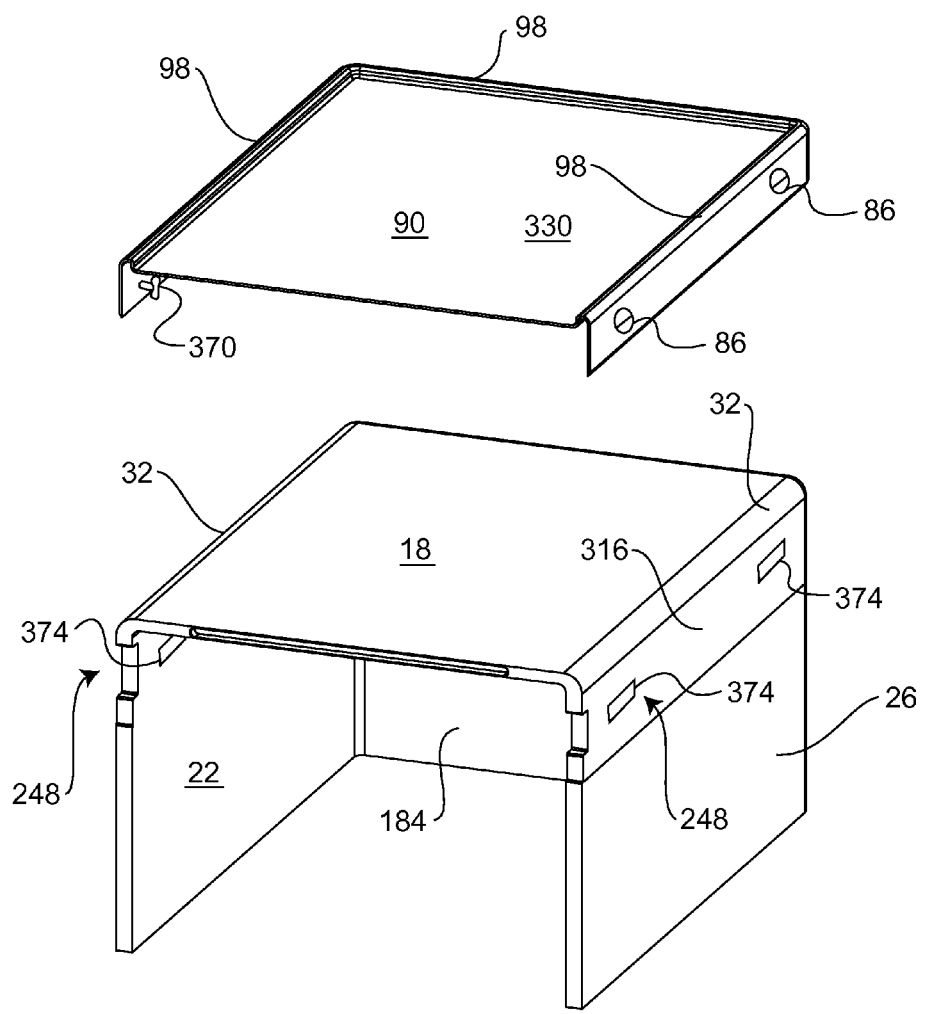
FIG. 14 is a magnified view of a upper portion of a half size galley cart in accordance with an embodiment of the present invention.

Moving now to FIG. 14 illustrating a more detailed exploded view of the cover element module 90 with the upper portion 18 of the body 14. The cover element module 90 is designed to slide fit the upper portion of the body 14 and be secured thereto with glue or fasteners. A recessed portion 316 having a depth significantly equivalent to the thickness of the cover element module 90 wall can optionally be performed in the body 14 to ensure an even exterior finish to reduce the risk of hooking exterior objects, like cloths or seat fabric material, when the galley cart 10, 180 is used. The cover element module 90 can alternatively be considered a utility module 330 in accordance with at least one embodiment.

Figure 15:
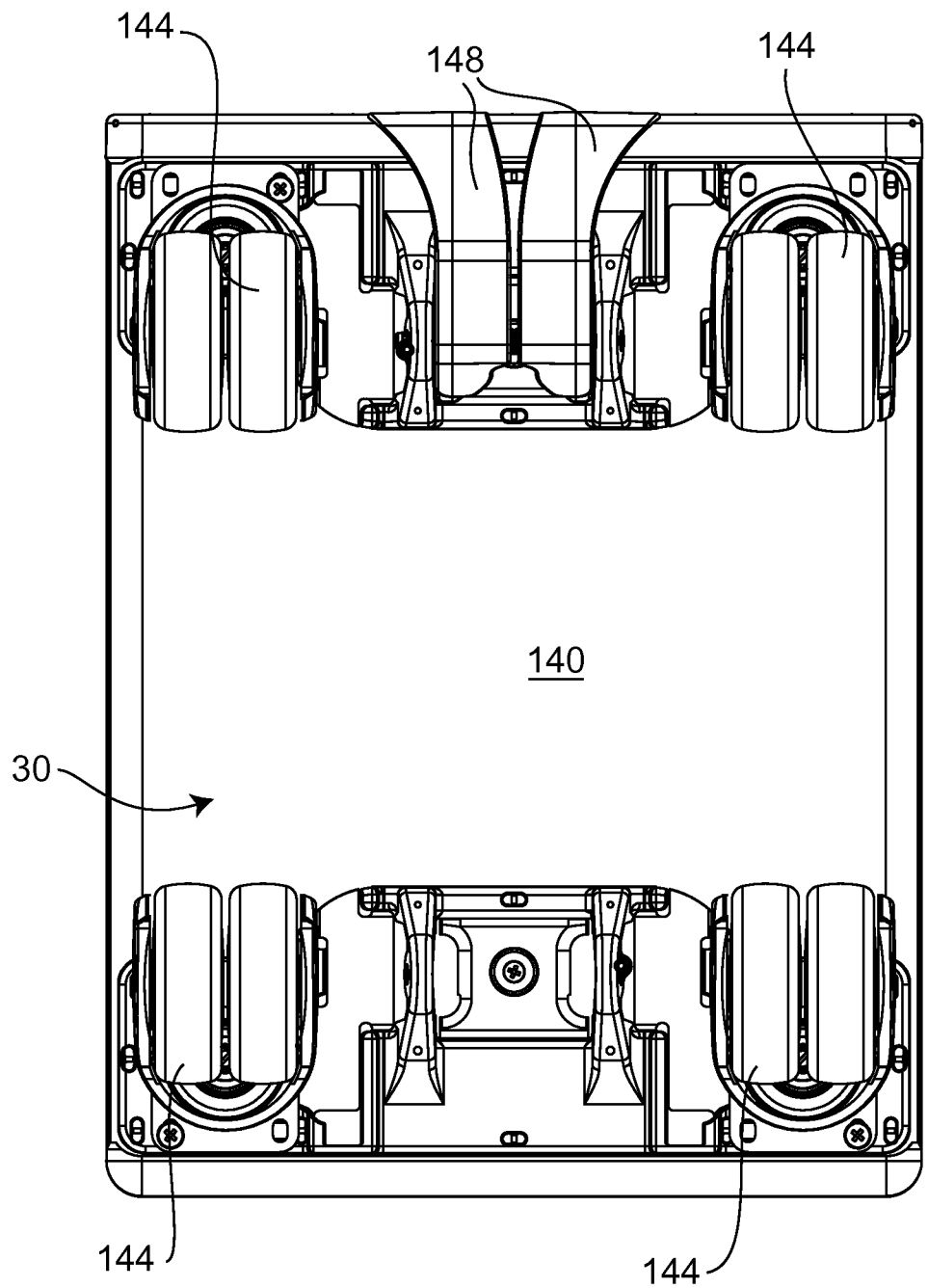
FIG. 15 is a bottom plan view of a half size galley cart in accordance with an embodiment of the present invention.

One embodiment of the invention providing a wheelbase 140 adapted to secure caster wheels 144 thereon is shown in FIG. 15. The wheelbase 140, as presented by the present embodiment, is a rigid panel helping distributing the mechanical load from the body 14 to the caster wheels 144. The wheelbase 140 can be glued or secured with fasteners to the bottom portion 30 of the body 14. An alternate embodiment directly secures the caster wheels 140 to the body 14 and a reinforcement plate (not illustrated) disposed inside the body 14 adjacent to the bottom wall portion 30. The reinforcement plate helps distribute the load to the complete bottom wall portion 30. A quick release mechanism could alternatively be used to easily install and remove the wheelbase 140 from the body 14. The quick release mechanism is a set of three grooved members disposed under the bottom wall portion 30 and configured to slide therein the wheelbase 140. A locking mechanism (not illustrated) is provided to prevent the wheelbase 140 to slide out of the quick release mechanism. Otherwise, the caster wheels 144 can be directly mounted to the body 14 if the strength of the body 14 is sufficient. Here again, the wheelbase 140 can also alternatively be considered a utility module 330.

Figure 16:
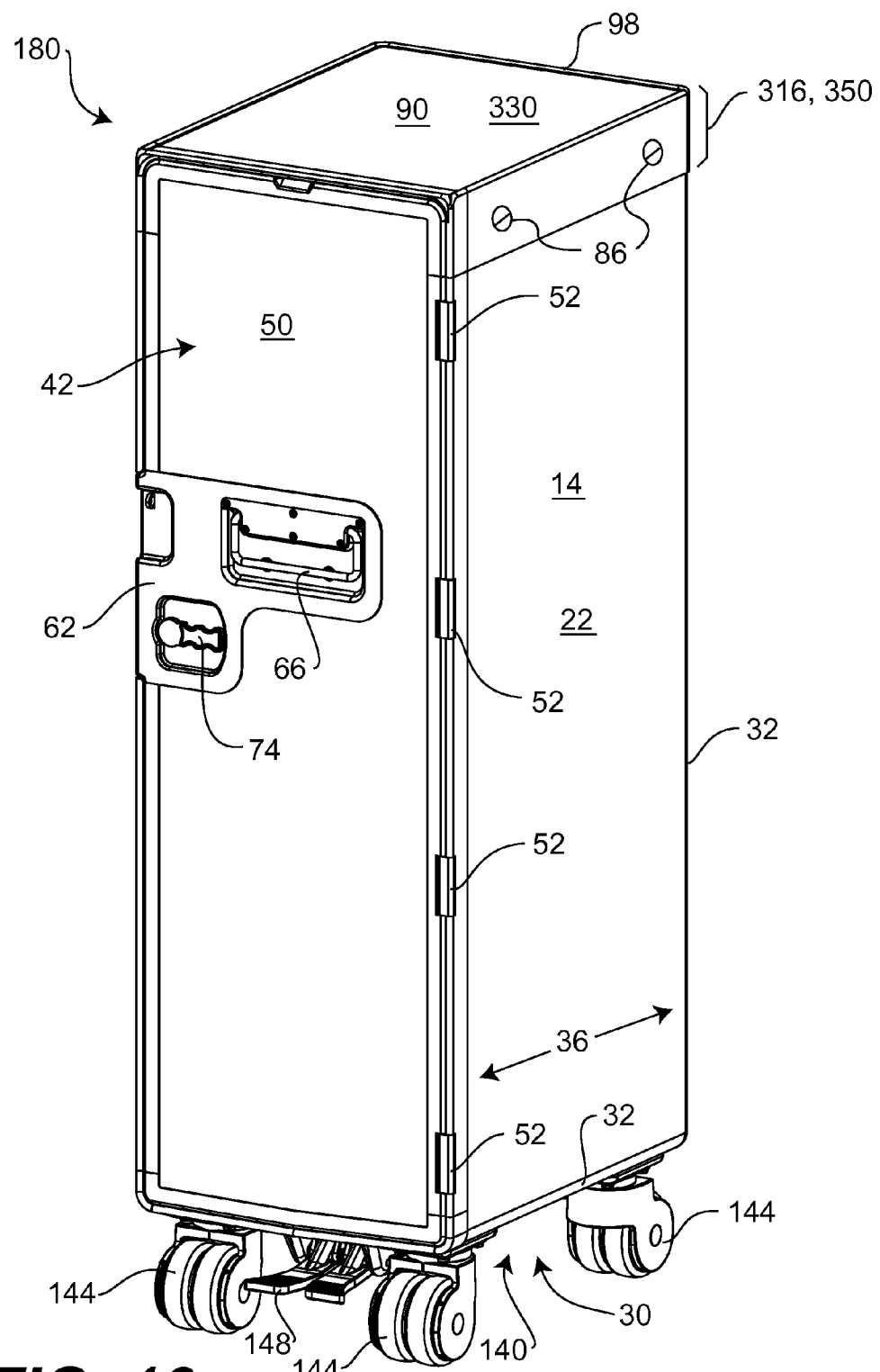
FIG. 16 is a perspective view of a body of a half size galley cart in accordance with an embodiment of the present invention.
Figure 17:
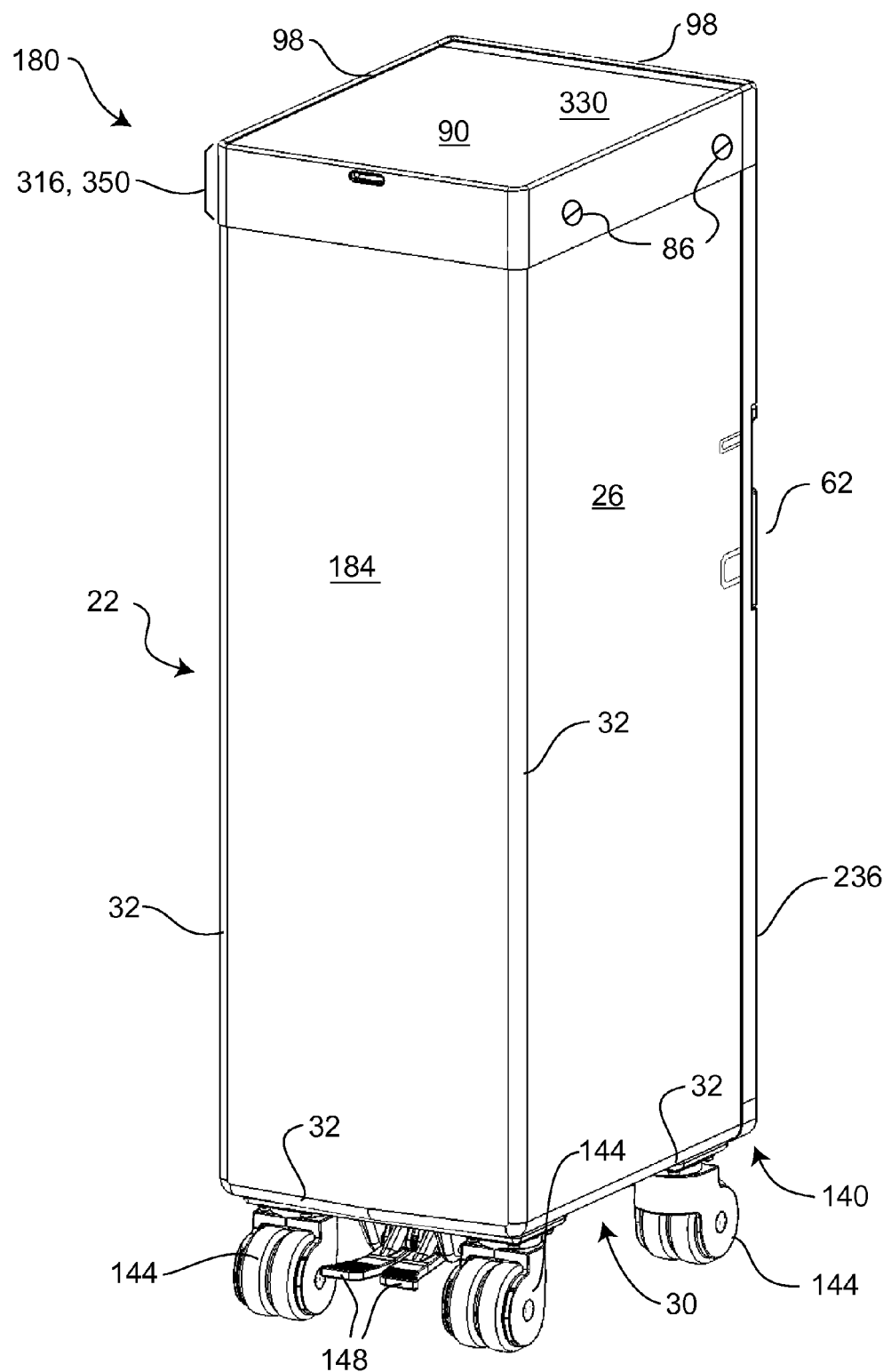
FIG. 17 is a rear perspective view of a body of a half size galley cart in accordance with an embodiment of the present invention.

FIG. 16 and FIG. 17 are illustrating another embodiment of the invention. The half size galley cart 180 presented herein does not have a tablet module 110 therein. The body 14 of the half size galley cart 18 uses the entire volume for receiving goods therein. The door 50 consequently covers the complete longitudinal opening 42 and gives access, when opened, to the complete internal volume of the body 14.

Figure 18:
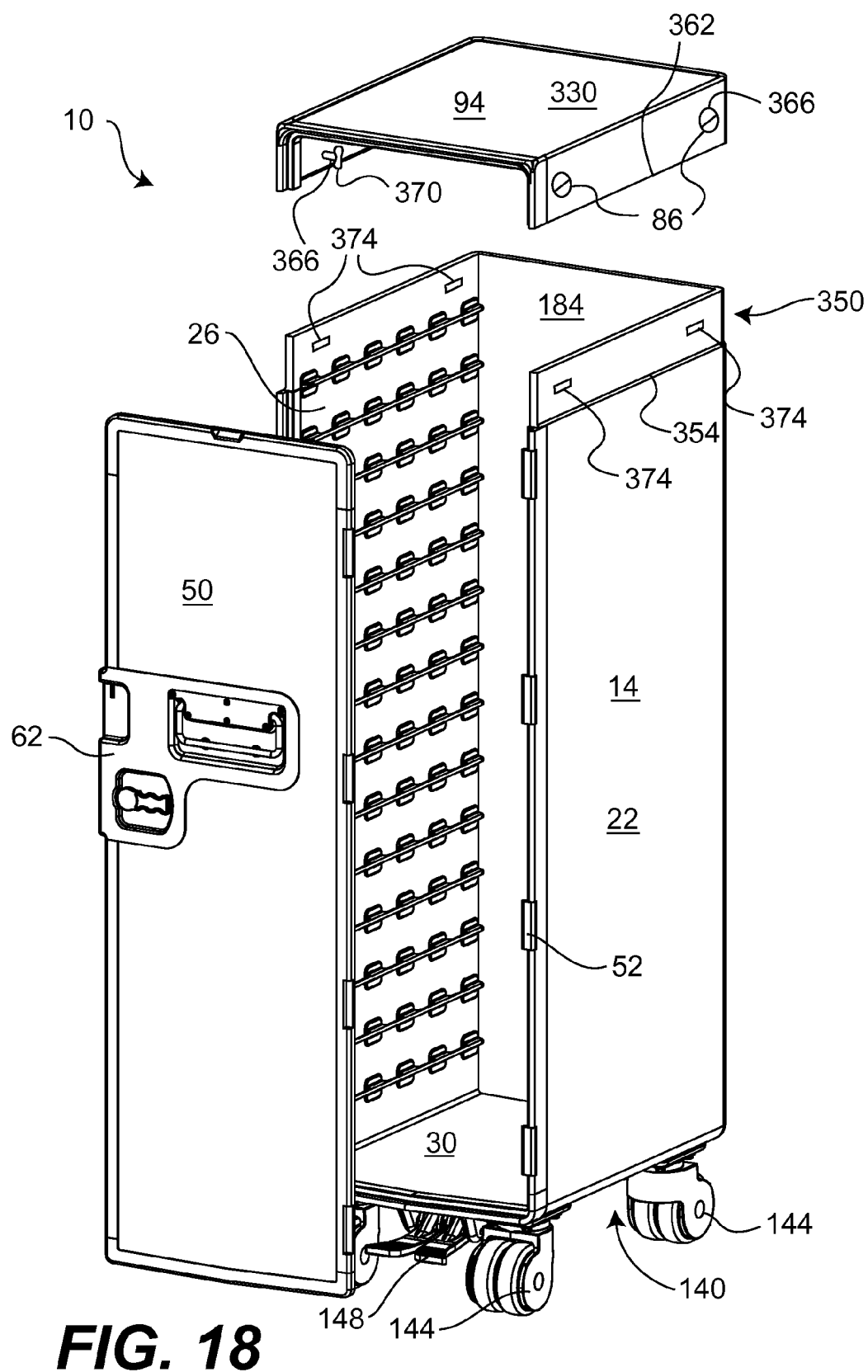
FIG. 18 is a perspective exploded view of a body of a half size galley cart in accordance with an embodiment of the present invention.

Turning now to FIG. 18 illustrating an alternate embodiment of a modular galley cart 10 provided with a body 14 and a utility module 330. The utility module 330 in accordance with embodiments of the invention is used to specialize the galley cart 10 for performing a task. The utility module 330 is adapted to be removably connected to the body 14 such that many utility modules 330 can be used in conjunction with a single body 14. Conversely, the utility module 330 can be permanently secured to the body 14 in accordance with embodiments of the invention.

As explained in connection with the embodiment illustrated in FIG. 1, the utility module 330 can be directly connected to the body 14. Alternatively, the body 14 is equipped of a module receptacle 350 to quickly remove/connect the utility module 330 to the body 14. The module receptacle 350 provides a positioning element 354 and the securing element 86 to locate the utility module 350 in respect with the body 14 and to secure the utility module 350 to the body 14. The embodiment of FIG. 18 illustrates a positioning element 354 in the shape of an edge on which rests the cooperating edge 362 of the utility module 330. The securing element in the embodiment of FIG. 18 is a rotating clip 366 provided with a "T" shaped fastener 370 sized and design to cooperate with slots 374 provided in the body 14. Turning 90 degree the rotating clip 366 locks the "T" shape fastener 370 in their respective cooperating slots 374. For example, the securing element 366 can be a quarter turn assembly fastener as illustrated in Spaenaur catalog, page L36, L37, Spaenaur number 110-064 that can be found at http://www.spaenaur.com/view_pdf.asp?Page=L37 with its mating member. Please note that the upper wall portion 18 has been removed on FIG. 18 to allow a better view of the body's 14 interior. In another embodiment, the upper wall portion 18 remains in the body 14 and the utility module 330 is secured thereon. Other fastener like the expandable fastener 440 that is going to be discussed later can be found at Spaenaur.com and other merchants.

Figure 19:
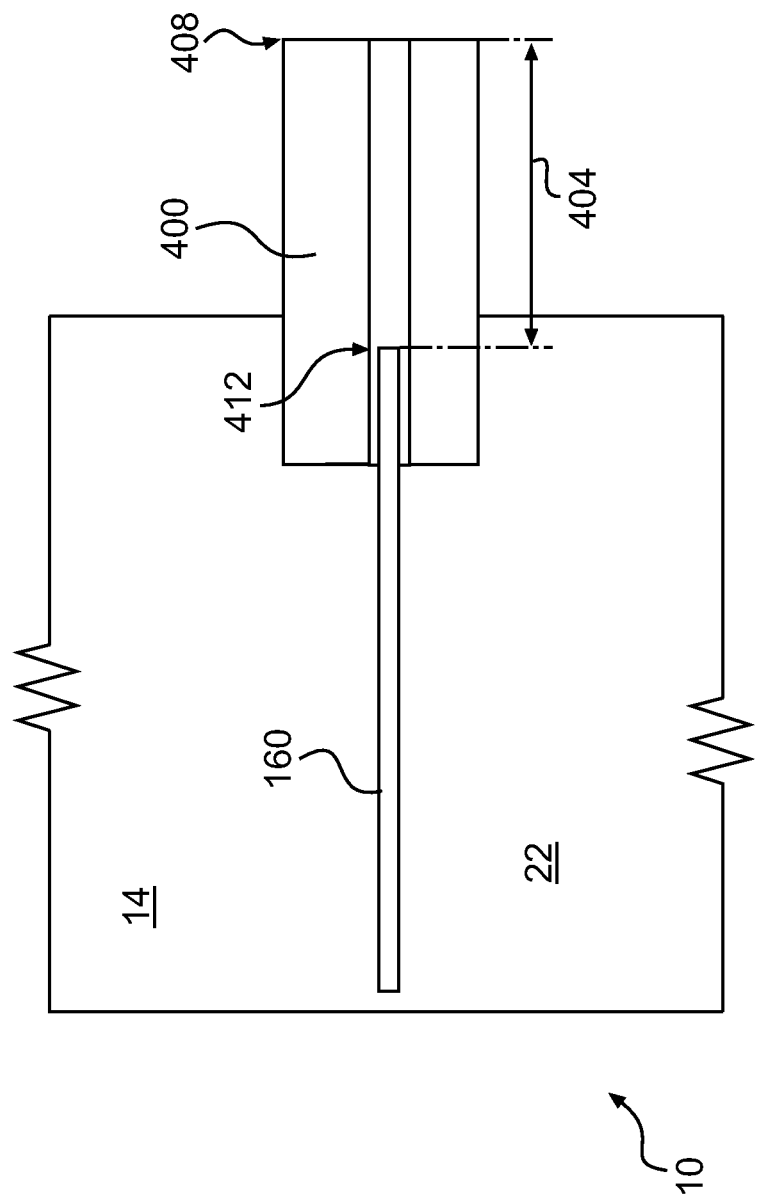
FIG. 19 is a schematic side elevational view of a galley cart with an expandable drawer in cantilever in accordance with an embodiment of the invention.

FIG. 19 depicts a lateral elevational view of a schematic interior of a galley cart 10. A drawer, or a bin 400, is pulled out of its supporting rails 160 thus creating a lever 404 applying a stress on the rail 160. When a weight is applied 408 on the drawer 400 (or put in the drawer 400) it generates a stress concentration 412 at the end of the rails 160. This concentration of stress 412 substantially mechanically pulls on the connection between the rails 160 and the side 22 of the galley cart 10. Some possible ways to improve the cohesion between the rails 160 and the body 14 of the galley cart 10 are detailed hereinafter.

Turning now to FIG. 20 illustrating a side sectional view of the right lateral portion 22 defining a recessed portion 416 adapted to receive therein an insert 420 in an embodiment of the present invention. We illustratively use the right lateral portion 22 of a cart 10 but the right lateral portion 22 can also be any wall portion that is intended to receive rails 160 thereon. The insert 420 is suited to offer an improved adhesion to the body 14 such that the rail 160 is strongly bonded to the right lateral portion 22. The recessed portion can be molded at the time the right lateral portion 22 is manufactured. It can also be performed by cutting the composite materials and grinding the foam core 268 of the body 14 after the right lateral portion 22 is manufactured. The insert 420 can be chemically secured, with glue or resin, for instance, with the right lateral portion 22. The insert 420 can also be molded in the right lateral portion 22 and be therefore secured with fibers and resin used to build the right lateral portion 22. Alternatively, the insert 22 can be secured with fasteners 424 to the right lateral portion 22. The fastener 424 can extend 428 from the insert 420 in the right lateral portion 22 or, in contrast, the fastener 424 can be secured from the right lateral portion 22 exterior toward the insert 432. Glue, resin or other mechanical fasteners can be used to further secure the rail 160 to the insert 420. It has to be noted that the rail 160 might be removably secured to the insert 420 such that it remains possible to remove the rail 160 for replacement or maintenance without effecting the right lateral portion 22 and the insert 420 secured therein.

FIG. 21 illustrates another embodiment using a hole 436 in the right lateral portion 22 to secure therein the rail 160. The hole 436 is sized and designed to press fit an expandable fasteners 440, a "Christmas tree" or a stem (not shown in FIG. 21) therein. The rail 160 is provided with at least one expandable fastener 440 extending therefrom in a preferred configuration. Alternatively, the rail 160 can be provided with at least one removable expandable fastener 440 assembled to the rail 160 where needed. The expandable fastener 440 can additionally be glued or chemically secured in the hole 436 to further secure the rail 160 to the right lateral portion 22 of the body 14.

Turning now to FIG. 22 a) illustrating a pre-tensed rail 160 that has tension 445 on its upper side and compression 450 on its lower side. This pre-tensed rail 160 improves the ability to sustain a load 455 on the upper surface of both ends thereof before experiencing a physical deformation of the rail 160 toward the ground. FIG. 22 b) further illustrates a pre-tensed rail 160 further having a slightly bent shape (note that the curve is exaggerated for illustrative purpose in FIG. 22 b)) to sustain a significant load 455 thereon before bending toward the ground. One of the effects of the pre-tensed rail 160 of the present embodiment is limiting to limit the load transmitted to the right lateral portion 22 of the body 14 by the end of the rail

160. The pre-tensed rail 160 accommodates a portion the load 455 before it transfers a significant load to the right lateral portion 22.

FIG. 23 illustrates another possible embodiment for securing a rail 160 to the body 14 of the galley cart 10. The right lateral portion 22 is built with a central foam core 268 and two layers of fibers 264, 272 respectively disposed on each side thereof. Each layer of fiber 264, 272 can comprise layups of fibers in the quantity required to perform the intended tack and sustain the expected loads. This embodiment defines a protrusion 460 adapted to mate, locate and secure a rail 160 thereon. The location of the protrusion 460 on the body 14 is adapted to properly locate the rail 160 to be installed thereon. The rail 160 has a shape 465 adapted to slidably mate with a standard drawer (not shown) on its outside and an internal shape 470 adapted to mate with the corresponding protrusion 460 located on the right lateral portion 22. The protrusion 460 mirrors the internal shape of the rail 160 to be easily assembled. No acute angles, inter alia, makes the protrusion 460 easier to mold by limiting the risk of trapping pockets of air in the composite materials. The rail 160 can be glued 475 and/or secured with fasteners (not illustrated) to the protrusion 460 as illustrated in FIG. 24. The load applied to the rail 160 is mechanically transferred to the corresponding protrusion 460 hence not solely relying to bonding thereof.

An alternate embodiment is illustrated in FIG. 25 where the protrusion 460 has a shape adapted to self-secure the rail 160 thereon. The protrusion 460 that is shown illustrates a possible external shape having two opposed recessed portions 480, 485 thereon adapted to clip on corresponding opposed portions defined on the internal shape 470 of the rail 160. One aspect of this embodiment is to create a self-engaging shape between the right lateral portion 22 and the rail 160. The rail 160 can further be glued or secured to the protrusion 460 to better connect both parts together. The protruding shape 460 illustrated in FIGS. 23-25 is for illustrative purpose only and the exact shape can vary without departing from the scope of the present invention.

Figure 26:
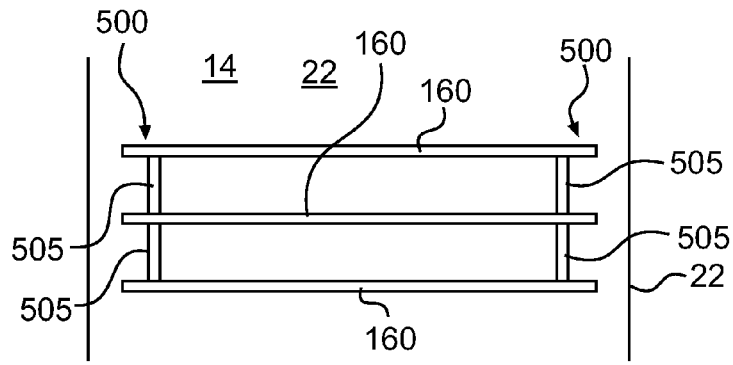
FIG. 26 is a schematic side elevational view of a galley cart with interconnected rails in accordance with an embodiment of the invention.
Figure 27:
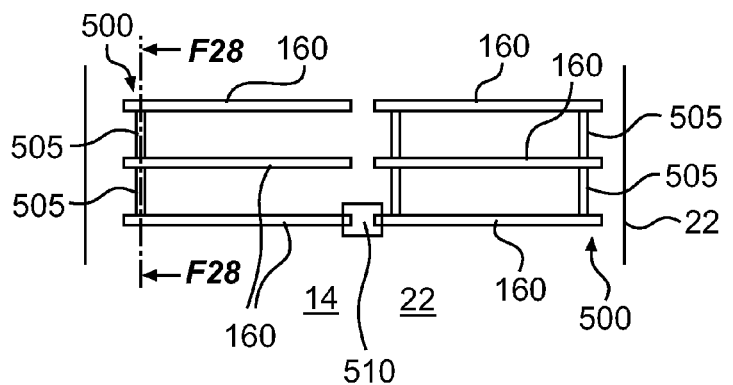
FIG. 27 is a schematic side elevational view of a galley cart with interconnected rails in accordance with an embodiment of the invention.

FIG. 26 and FIG. 27 are showing another embodiment adapted to distribute the stress applied to on the rail 160 to another adjacent rail 160 thus preventing applying excessive mechanical stresses on the ends 500 of the rail 160 and the right lateral portion 22 of a cart 10. FIG. 26 illustrates rails 160 made of a single part over their entire length. The extremities 500 of the rails 160 are interconnected via a connector 505. The connector 505 substantially vertically transfers at least a portion of the load of a stressed rail 160 to another adjacent rail 160 that might be less solicited by its own drawer. Conversely, FIG. 27 illustrates rails made of multiple parts. Abutting rails 160 can optionally be interconnected with a connector 510. The connector 510 helps transfer mechanical load between two aligned rails 160 and ensure continuity therebetween to receive a drawer (not shown) thereon. In this embodiment, the extremities of two longitudinally aligned rails 160 are interconnected together with rails connectors 510 to distribute the load carried by one rail 160 to the other abutted rail 160. The connector 510 can be fitted on each end of two aligned rails 160 or be secured thereto otherwise.

Figure 28:
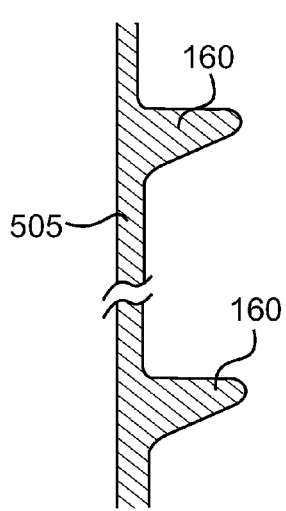
FIG. 28 is a schematic front elevational section view of the vertically interconnected rails of FIG. 27 in accordance with an embodiment of the invention.
Figure 29:
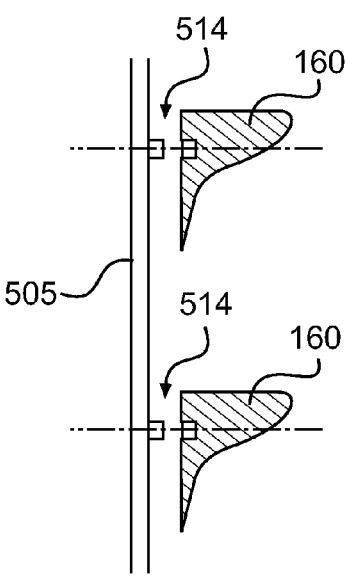
FIG. 29 is a schematic front elevational sectional view of two rails assembled to a vertical connector in accordance with an embodiment of the invention.

FIG. 28 is a side elevational view of the series of rails 160 connected by a connector 505 illustrated in FIG. 27. In this embodiment, the connector 505 is made part of the rails 160. They can be molded in a single part or glued together so that they come like if they where made of a single part. The rails 160 and their related connectors 505 can be directly secured to the right lateral portion 22 at their desired distance thereof. The connector 505 also increases the contact area (useful to put glue thereon and increase the shear area) with the right lateral portion 22. The increased contact area reduces the stress applied locally to the body 14 and is particularly desirable when the right lateral portion 22 is made of composite materials—generally not well suited to sustain significant local mechanical stresses. In turn, FIG. 29 illustrates another alternate embodiment where the rail 160 is connected to a removable connector 505. A mechanical locking means 514 helps locate and secure the rail 160 to the connector 505. In this embodiment, a series of stems 514 are mechanically interlocking the rails 160 together. The connector 505 can be glued or snap fitted to the rails 160.

Figure 30:
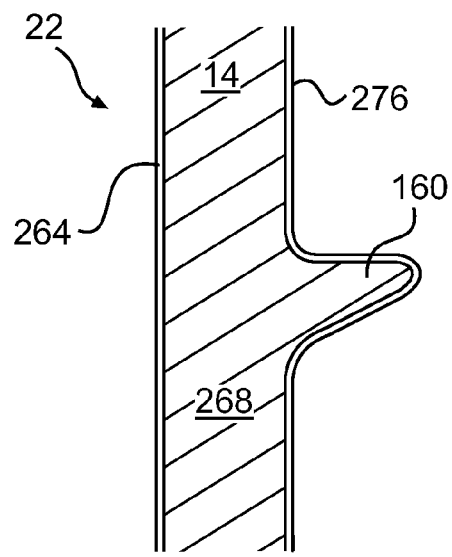
FIG. 30 is a schematic front elevational sectional view of a portion of composite wall member and a rail defined therein in accordance with an embodiment of the invention.
Figure 31:
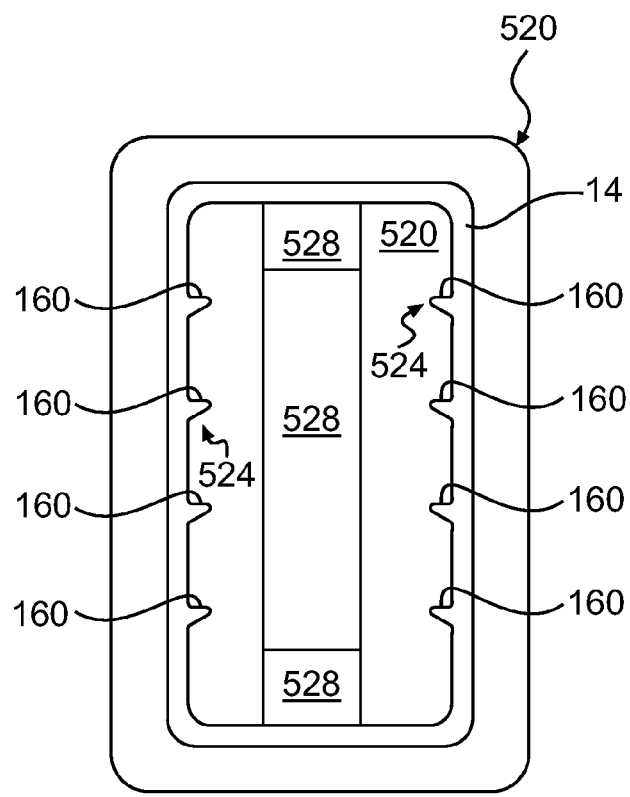
FIG. 31 is a schematic front elevational view of a mold adapted to manufacture a composite materials galley cart with embedded rails therein in accordance with an embodiment of the invention.

Turning now to FIG. 30 illustrating a side elevational section view of a right lateral portion 22 of the galley cart 10. In this embodiment, the rail 160 is formed in and protrudes from the right lateral portion 22. The core 268 fills the volume required to shape the rail 160 directly in the right lateral portion 22. One or many layers of fibers 276 cover the rail 160 formed in the right lateral portion 22. FIG. 31 illustrates a mold 520 defining a series of cavities 524 adapted to shape the rails 160 with the molding process. Mold drawers 528 are provided with the mold 520 to unmold the body 14 if the design of the body 14 has undercuts defined therein. The mold 520 shown in FIG. 31 is for illustrative purposes and could be adapted to various methods to mold plastics and other materials.

Figure 32:
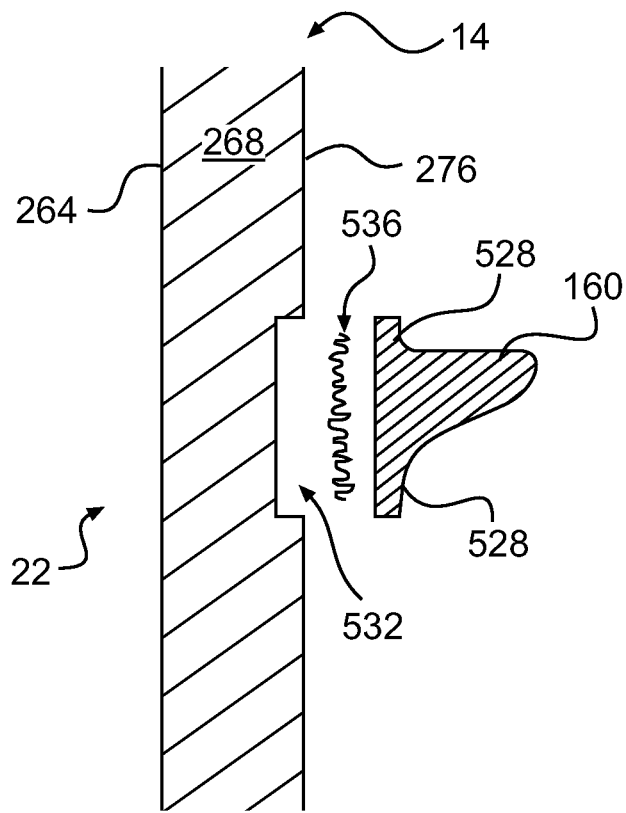
FIG. 32 is a schematic front elevational sectional view of a portion of composite wall member and a rail with another securing mechanism in accordance with an embodiment of the invention.

The right lateral portion 22 illustrated in FIG. 32 defines a cavity 532 adapted to receive therein a counterpart rail 160. The cavity 532 and the rail 160 are further secured together with adhesive 536, or resin, applied therebetween. The cavity ensures a strong mechanical localization of the rail 160 and is large enough to prevent significant stress concentration in the composite materials of the right lateral portion 22. The vertical portions 528 of the rail 160 are preferably flush with the interior surface 276 of the right lateral portion 22 when the rail 160 is fitted in the cavity 532.

Figure 33:
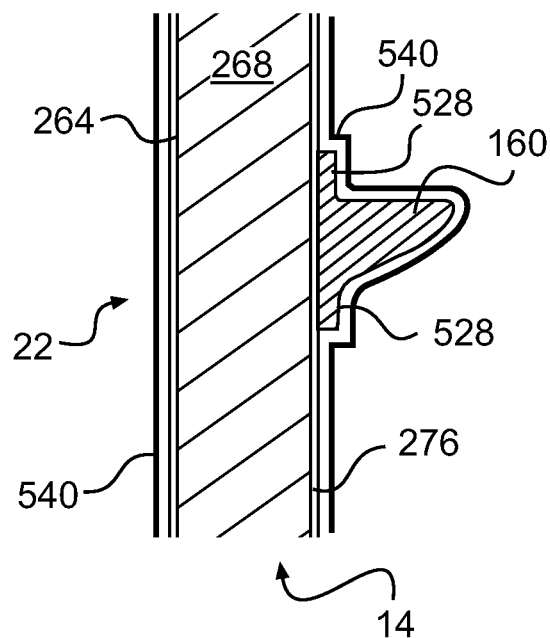
FIG. 33 is a schematic front elevational sectional view of a portion of composite wall member and a rail with a securing mechanism in accordance with an embodiment of the invention.

The rail 160 can be positioned on the right lateral portion 22 and over molded with the right lateral portion 22 as illustrated in FIG. 33. The rail 160 is stuck or secured in a manner to adequately locate the rail 160 on the interior surface of the right lateral portion 22. After, fibers are applied and resin 540 is injected in the mold (in the case of an injection process) or brought under negative pressure in a bag (not illustrated) to infuse, soak and wrap the rail 160 with the right lateral portion 22. The rail 160 can optionally be installed in a recessed portion (as illustrated in FIG. 32) to further locate the rail 160 in respect with the right lateral portion 22. Again, the vertical portions 528 of the rail 160 are preferably flush with the interior surface of the right lateral portion 22 when the rail 160 is fitted in the cavity 532.

Figure 34A:
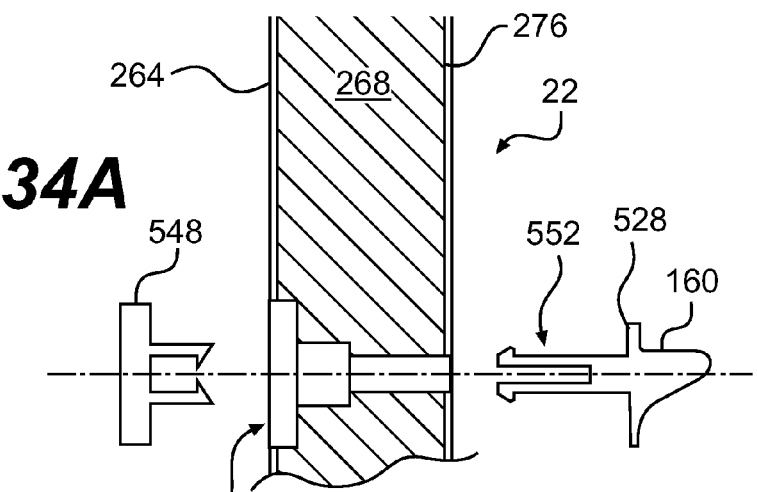
FIG. 34 is a schematic front elevational sectional views of a portion of composite wall member and a rail with a securing mechanism at different stages in accordance with an embodiment of the invention.
Figure 34B:
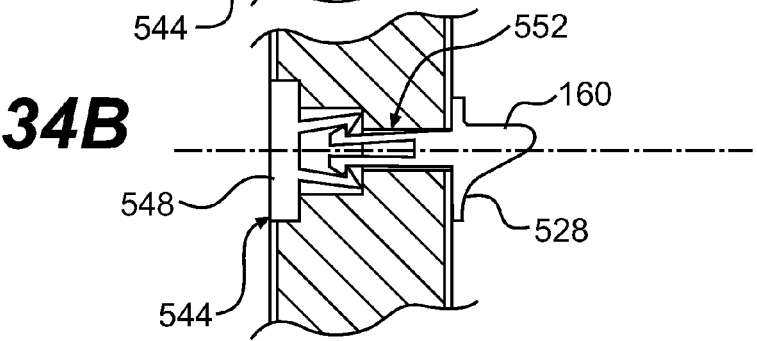
Figure 34C:
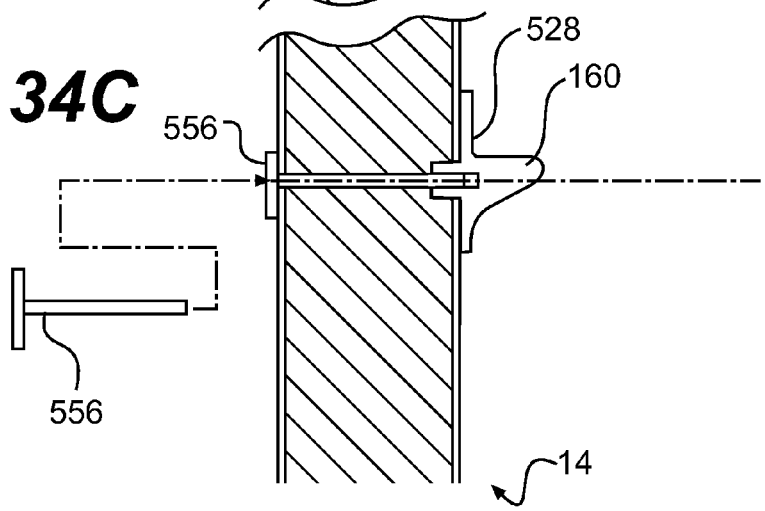

Turning now to FIG. 34 illustrating at step a) a recessed portion 544 adapted to receive therein a mating connector 548. The mating connector 548 is assembled in the recessed portion 544 to connect the counterpart connector portion 552 extending from the rear of the rail 160. The assembled configuration is depicted at b). A clipping mechanism is illustrated between the mating connector 548 and the counterpart connector portion 552 for illustrative purpose and could be replaced by any other securing means like a "Christmas tree", threads, glue, ultrasonic welding . . . without departing from the scope of the present invention. An alternate illustrative embodiment using a simple stem 556 inserted in a corresponding opening performed in the rear of the rail 160 and secured with glue is depicted at c).

We now move on with another embodiment illustrated in FIG. 35 depicting the right lateral portion 22 defining an opening 560 adapted to receive therein a rod 564. The opening 560 communicates with orthogonal apertures 568 in the right lateral portion 22. FIG. 36 depicts extending portions 572 protruding from the rear surface of the rail 160 and are adapted to fit in the openings 568 and receive therein the rod 564 that is going to mechanically lock the rail 160 to the right lateral portion 22. One can contemplate the assembled structure at FIG. 37. The rail 160 is installed in its respective aperture 568 and the rod 564 is inserted in the opening 560 to pass through the respective opening 576 of the rail 160 and locks the rails 160 with the right lateral portion 22. Again, a plurality of rails 160, each having a plurality of preferably equally spaced extending portions 572 is encompassed by the present description despite the illustrative exemplary embodiments are often directed to a single rail 160 showing a single extending portion 572.

FIG. 38 is an example of another alternate embodiment where the rail 160 is provided with a plurality of "T" shaped protrusions 580 that are inserted in respective openings 568 and locked in place with a corresponding "T" shaped securing clip 584 adapted to longitudinally slide along the exterior side of the right lateral portion 22 to engage a series of "T" shaped protrusions 580 associated with a rail 160. The "T" shaped securing clip 584 can also offer a visual distinctive line on the outside of the galley cart 10.

FIG. 39 illustrates a body 14 having reinforcement structures 590 on each longitudinal side thereof. Increased strength is provided by the reinforcement structure 590 embedded in the composite materials of the body 14. The reinforcement structure 590 is located on the longitudinal sides of the body 14 where the ends of the rails 160 are located and secured. The ends of the rails 160 are both secured to the body 14 and to the reinforcement structures 590 as it can be seen in FIG. 40. Significantly less local stress is applied to the composite materials of the body 14 because the rails 160 are secured to the reinforcement structure 590 as best seen in FIG. 41. For example, holes 595 are provided in the reinforcement structure 590 and not only in the composite materials. It is understood that it might be desirable to cover the reinforcement structure 590 with fibers and mold the reinforcement structure 590 therein for additional stiffness and better aesthetic integration although it is not mandatory. The reinforcement structure 590 is preferably made of a light and strong material. In order to save additional weight, the reinforcement structure 590 can be produced to remove as much material as possible to remove a maximum of weight. FIG. 42 illustrates an exemplary isolated reinforcement structure 590 with a series of openings 595 therein adapted to secure rails 160 thereto and hollowed portions 600 intended to remove non required material and keep the part as light as possible.

FIGS. 43 through 49 are illustrating an exemplary rail 160 adapted to be secured to the internal side surface of the body 14 of the galley cart 10. The rail 160 comprises a plurality of expandable fasteners 440 extending therefrom and adapted to mate cooperating holes 436 (not shown on these figures but visible on FIGS. 50-52) disposed at desired locations on the body 14. The holes 436 are performed in the body 14 and in the foam core 268 but are generally not passing through the body 14 to ensure a holeless exterior body 14 surface. The holes 436 have a chosen diameter adapted to receive therein their counterpart expandable fastener 440 associated with the rail 160 with a press fit. Each expandable fastener 440 engages the exterior surface of the body 14 that is made of composite materials in the present embodiment although its application is not solely applicable to composite materials structures. The expandable fastener 440 further reaches within the body 14 and secures within the body 14 with the press fit occurring between the expandable fastener 440 and the body 14. There are therefore at least two purposes to the expandable fasteners 440. One purpose is to mechanically locate the rail 160 about the body 14 to which it is secured and the other is to mechanically secure the rail 160 to the body 14.

The mechanical connection between the rail 160 and the body 14 is further improved by the addition of a chemical bond between the rail 160 and the body 14. A bonding material 604 is added prior to installing the rail 160 to the body 14 to bond the rail 160 and its expandable fasteners 440 to the body 14; thus increasing significantly the junction between the rail 160 and the body 14. The rail 160 includes a preferably flat rear surface 608 used as bonding area and bordered by a protruding rib 612. The protruding rib 612 raises the rear edges surrounding the rear surface 608 to create a cavity 616 therein. The height of the protruding rib 612 is used to determine the depth of the cavity 616, and, consequently, the desired thickness of bonding material 604 that will remain once the rail 160 is secured to the body 14.

The cavity 616 is sized and designed to receive glue, resin or other bonding materials 604 therein prior to installing the rail 160 to the body 14. That ensures that a complete layer of bonding material 604 remains between the rail 160 and the internal surface of the body 14 of the galley cart 10 when the rail 160 is pressed on the internal surface of the body 14. The bonding material 604 cures and further secures the rail 160 to the internal surface of the body 14 of the galley cart 10. The size of the bonding area is sized and designed to offer sufficient mechanical strength and spreads the stress to a surface of the body 14 that is large enough to avoid undesirable stress concentration that could lead to delaminating of the composite material.

Figure 49:
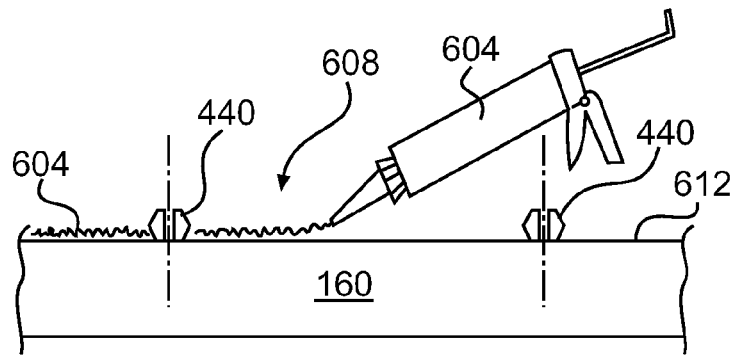
FIG. 49 is a schematic top plan view of a rail with adhesive applied thereon in accordance with an embodiment of the invention.
Figure 50:
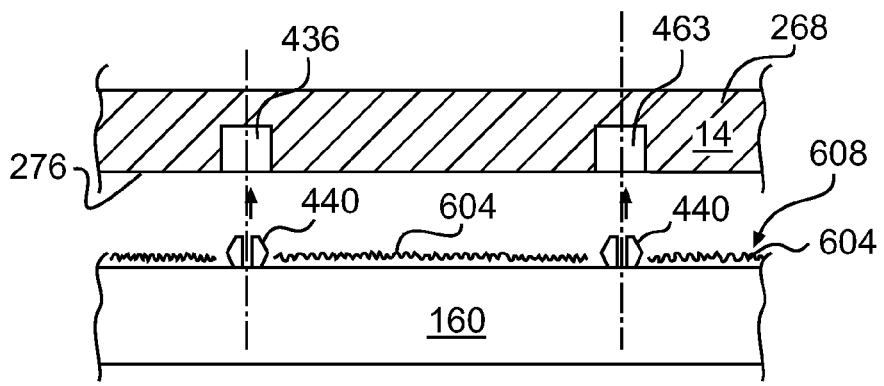
FIG. 50 is a schematic top plan view of a rail with adhesive applied thereon ready to be secured to a composite panel in accordance with an embodiment of the invention.
Figure 51:
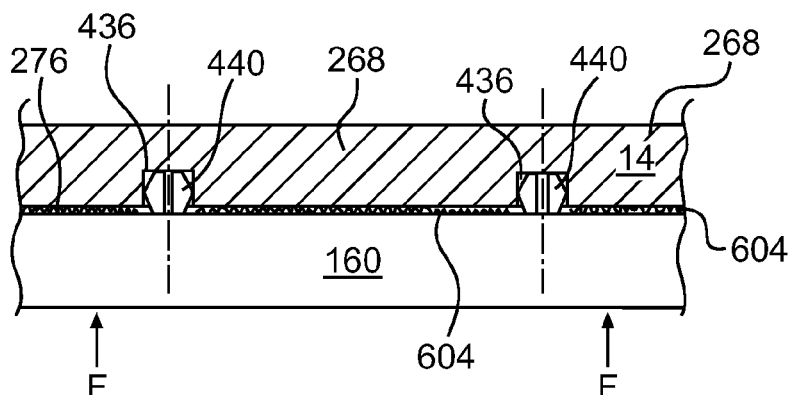
FIG. 51 is a schematic top plan view of a rail with adhesive applied thereon secured to a composite panel in accordance with an embodiment of the invention.

Another exemplary method of an embodiment of the present invention is illustrated in FIG. 49 through FIG. 51. Bonding material 604 is applied on the rear surface of the rail 160 as shown in FIG. 49. Once the required amount of bonding material 604 is applied, the rail 160 and its expandable fasteners 440 are aligned with the holes 436 and the expandable fasteners 440 are pressed into their respective holes 436, as it is shown in FIG. 50, with force F. As previously mentioned, the engagement of the expandable fasteners 440 with the holes 436 has mainly two effects: first, it locates the rail 160 in respect with the holes 436 and therefore with the body 14 of the galley cart 10; no jig is thus required. Secondly, the expandable fasteners 440 are maintaining in place the rail 160, given their press fit in the holes 436, until the bonding material 604 has cured and is firmly securing the parts together as it is illustrated in FIG. 51. The expandable fasteners 440 hold in place the rail 160, possibly without any other external intervention, so that the rail 160 is properly secured to the body 14. The ribs 612 are pushed against the surface of the body 14 and ensure that bonding material 604 contained in the cavity 616 does not escape and contacts both the rail 160 and the body 14. This helps to make sure what the bonding area is covered with sufficient bonding material 604 once the rail 160 has been pushed against the body 14. This method of assembling a rail 160 to a body 14 can also be used for securing a resilient member 200, a bumper, aesthetic edges, covers or other elements to a body 14 and other elements and parts illustrated, inter alia, in FIG. 9.

Figure 52:
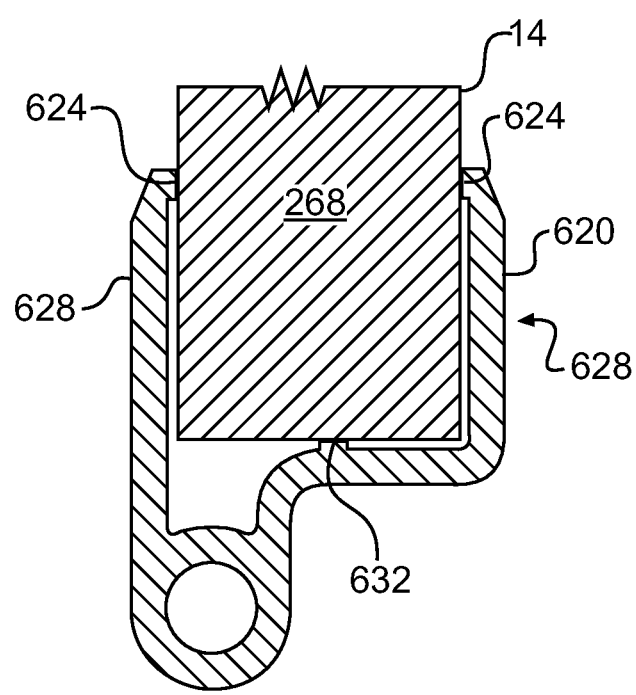
FIG. 52 is a schematic sectional view of a frame member with a composite panel in accordance with an embodiment of the invention.

Turning now to FIG. 52 illustrating an additional member 620 configured to be used in conjunction with a portion of the body 14. The additional member 620 of the illustrated embodiment could alternatively be made with an extrusion process or a molding process as it is going to be described later in this specification. The shape of the depicted additional member 620 is intended to cover an extremity or an edge of a portion of the body 14. This is why the illustrated shape has a "U" shape and covers three (3) sides of the illustrated portion of the body 14.

The additional member 620 is provided with opposed ribs 624 adapted to contact both opposed sides of the composite panel that is used for building the body 14. The two opposed ribs 624 define a distance therebetween that is slightly smaller than the thickness of the body panel to create a press fit ensuring that the additional member 620 is going to keep in place without any other external intervention. The opposed ribs 624 that are illustrated on the ends of each leg 628 of the additional member 620 could have been disposed further from the ends of the legs 628 and have a different length/width without departing from the scope of the present invention.

There are provided means to define a distance between the body 14 and the interior surface of the additional member 620. The distance thus created by the rib 624 between the legs 628 and the surface of the body 14 is sized to accommodate a predetermined amount of bonding material 604 therein. Consequently, the surface defined between the additional member 620 and the body 14 represents the bonding area used to transmit mechanical loads between the additional member 620 and the body 14. In the present embodiment, a distance of about 0.25 millimeter is preferably provided. It might also be desirable to use a distance between 0.20 millimeter and 0.30 millimeter and even a distance between about 0.10 millimeter and 0.5 millimeter depending of the properties of the bonding material 604. A bottom rib 632 is provided at the bottom of the additional member 620 to prevent the body 14 panel to reach the bottom of the additional member 620 leaving no distance between the body 14 and the additional member 620. The gap thus created between the bottom of the additional member 620 and the body 14 allows room for receiving the desired quantity of bonding material 604 therein. Again, the quantity, the size, the height and the position of the bottom rib 632 are used to create the optimal volume to receive a predetermined bonding material 604 therein.

Figure 53:
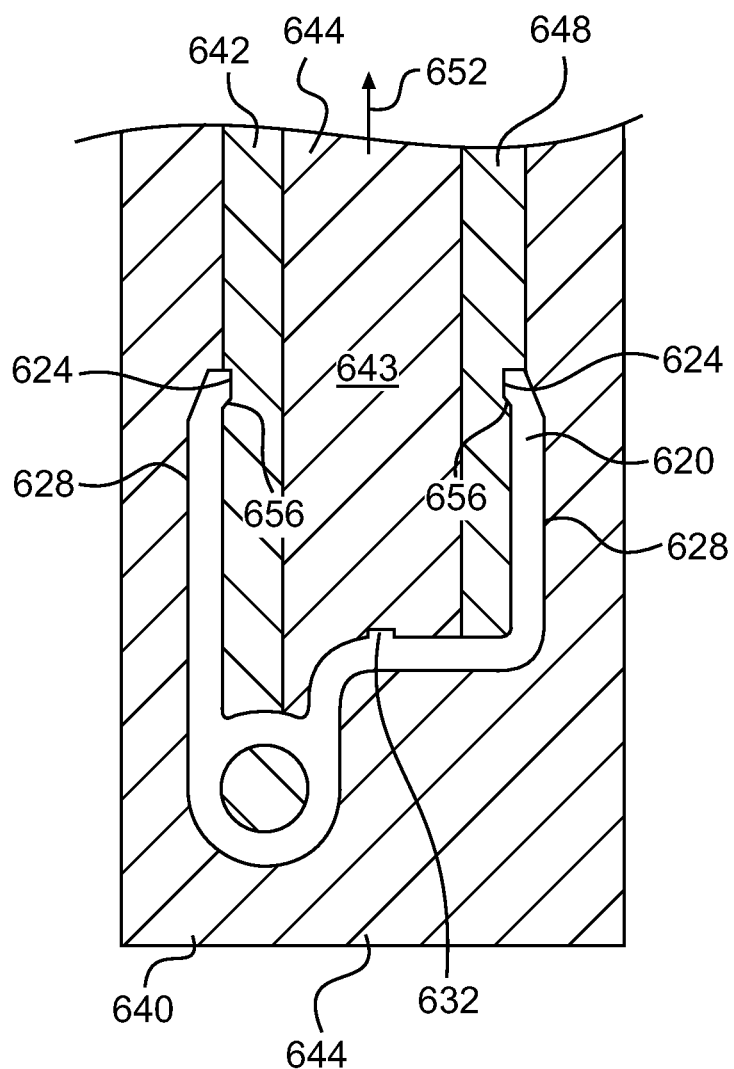
FIG. 53 is a schematic sectional view of a rail with its mold in accordance with an embodiment of the invention.

FIG. 53 illustrates an additional member 620 built with an injection process and a four-part mold 640, 642, 644 and 648. The extraction of the additional member 620 from the mold 640, 642, 644 and 648 is made first by removing the interior drawer section of the mold 644. The remaining central portion of the mold 644 is going to be pulled as identified by arrow 652 and leave place for removing the two other internal portions of the mold 642, 648. In contrast, a single internal portion of the mold, made of combined parts 642, 644 and 648, could be extracted from within the center of the additional member 620 once the exterior part of the mold 640 is removed. In so doing, the opposed ribs 624 are provided with an angled portion 652 adapted to let go the central portion of the mold 648 when the central portion of the mold 648 is pulled away. The angled portions 652, as opposed to the square shape illustrated in FIG. 52, prevent blocking the extraction of the central portion of the mold 648 by letting the two legs 628 flexing apart from one another.

Figure 55:
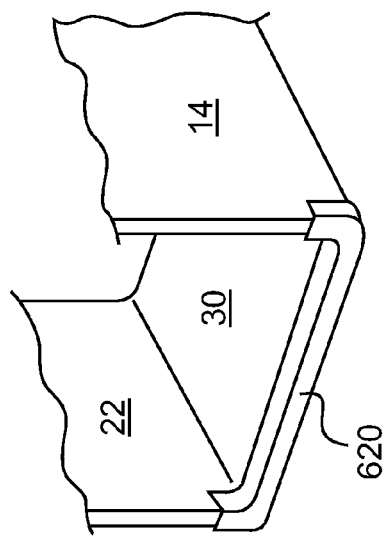
FIG. 55 is a top plan view of a contour frame assembled to a galley cart body in accordance with an embodiment of the invention.
Figure 54:
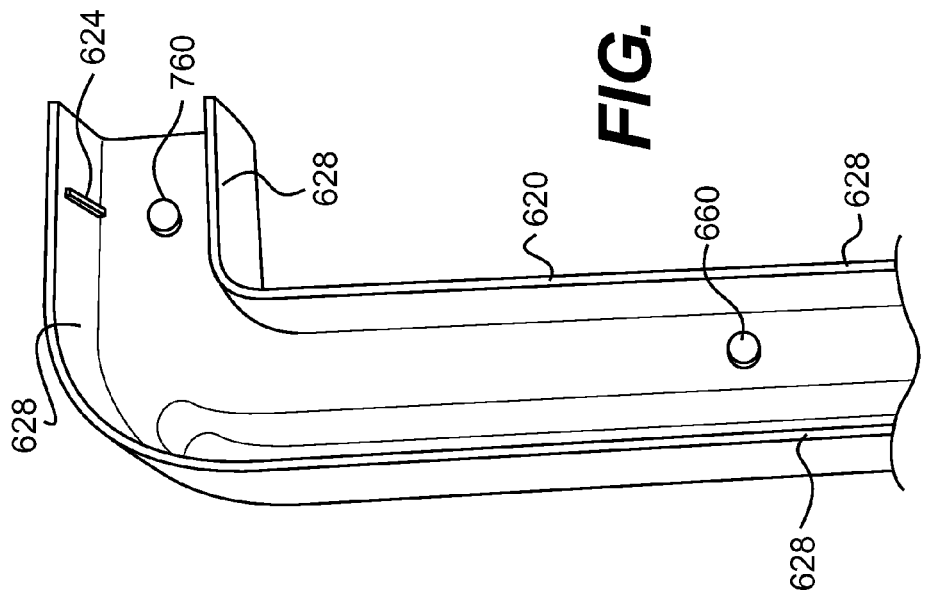
FIG. 54 is a schematic isometric view of a contour frame in accordance with an embodiment of the invention.

One can appreciate that the additional member 620 illustrated on these figures includes a length long bottom rib 632 and opposed ribs 624. Partial length long bottom rib 632 and opposed ribs 624 could alternatively be used. Stem-like spacers 660 could replace the length long bottom rib 632 as illustrated in FIG. 54. It can be appreciated that the bottom rib 632 and the opposed ribs 624 shown in FIG. 52 for instance are endless if they are produced with an extrusion process. In the event of a molded part, the bottom rib 632 and the opposed ribs 624 might be endless but they can also have the shape of small stems 660 protruding with a predetermined length from the interior surface of the subject part as it can be seen in FIG. 54 to properly distance the additional member 620 from the body 14 to accommodate therein a predetermined quantity of bonding material 604. FIG. 55 illustrates the additional member 620 affixed to the body 14 of a galley cart 10. The assembly of the additional member 620 with the body 14 is depicted in FIG. 55 where the molded part 620 is shaped and designed to be axially installed at the end of a "U" shaped body 14.

FIG. 56 depicts a rail 160 illustrated from various sides in accordance with another embodiment of the invention. The rail 160 is provided with a series of substantially equidistant pins 664. The pins 664 substantially extend beyond the rear surface 608 to be inserted into cooperating holes disposed in the body 14 (not illustrated). The cooperating holes are sized and designed to receive the pins 664 with a press fit design. Holes can be roughly drilled in the body 14 such that the pin 664 is most likely to remain trapped in the hole with the crushed fibers therein. The dimensional tolerances between the pins 664 also help secure the pins 664 in their respective holes since minor misalignments will help press fit the pins 664 in the holes pattern.

Figure 57:
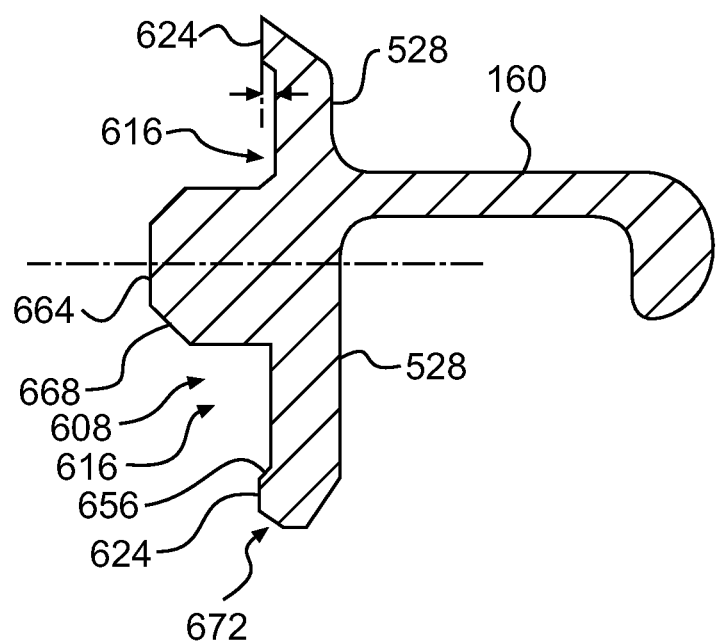
FIG. 57 is a front elevational section view of a rail in accordance with an embodiment of the invention.

A magnified portion of the rail 160 is illustrated in FIG. 57 where a pin 670 extends from the rear surface 608 of the rail 160. The pin 664 of the present embodiment is substantially cylindrical and further defines thereof a radius or a chamfer 668 to ease insertion of the pin 664 in its corresponding hole in the body 14. The length of the pin 664 is sufficiently long to engage its respective hole and ensure a sufficiently strong connection thereof. Ribs 624 are disposed on each side of the rail 160 to circumscribe a cavity 616 adapted to receive bonding material 604 therein. The installation of the rail 160 on the body 14 pushes the excess of bonding material 604 outside of the cavity 616. The excess of bonding material 604 can be whipped out to provide a clean finish. The lower section of the rail 160 defines an additional chamfer 672 sized and designed to retain some of the bonding material 604 therein when the excess of bonding material 604 is whipped off to provide a smooth finish.

The press fit of the pins 664 in their respective holes provides a clamping of the rail 160 to the body 14 for the period of time required to cure the bonding material 604 therebetween without having recourse to a securing jig or any other pressure thereon. Once the bonding material 604 has cured it ensures a strong mechanical link between the rails 160 and the body 14 and the pins 664 do not have to withhold much stresses although they continue to help maintaining the rail 160 to the body 14.

Figure 58:
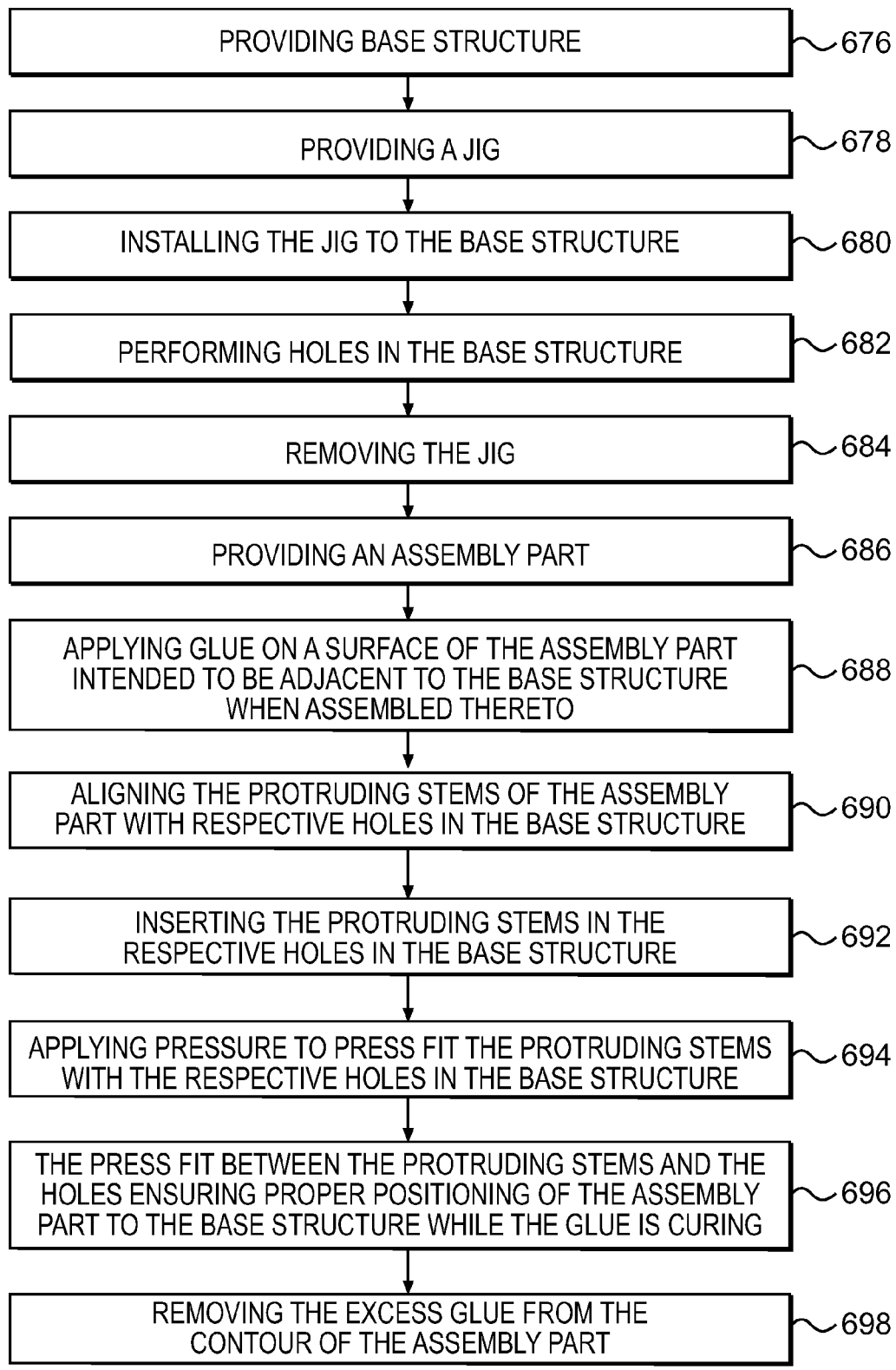
FIG. 58 is a flow chart of a series of illustrative steps detailing how to secure a part to a composite structure in accordance with an embodiment of the invention.

Moving now to FIG. 58 that illustrates a typical exemplary set of steps used in respect with at least one embodiment of the invention. Firstly, a base structure is provided 676. The base structure can be any part of the body 14 of a galley cart 10 or another composite part used in other designs or objects where another part is to be assembled. A drilling jig is provided 678 and is installed on the base structure 680 in which are going to be performed a series of holes 682. The jig is removed 684 once the holes are made in the base structure. Then the assembly part is provided 686 and bonding material is applied on the surface of the assembly part that is going to interface with the base structure 688. The stems or the pins are aligned with their respective holes 690 and the assembly part is pressed on the base structure to engage the pins in their respective holes 692. Sufficient pressure is put on the assembly part 694 to firmly and completely engage the pins in their holes 696 to securely maintain the assembly part to the base structure while the bonding material has set. Pressure exercised on the assembly part also squeezes out the excess bonding material that is going to be removed if required 698.

Figure 59:
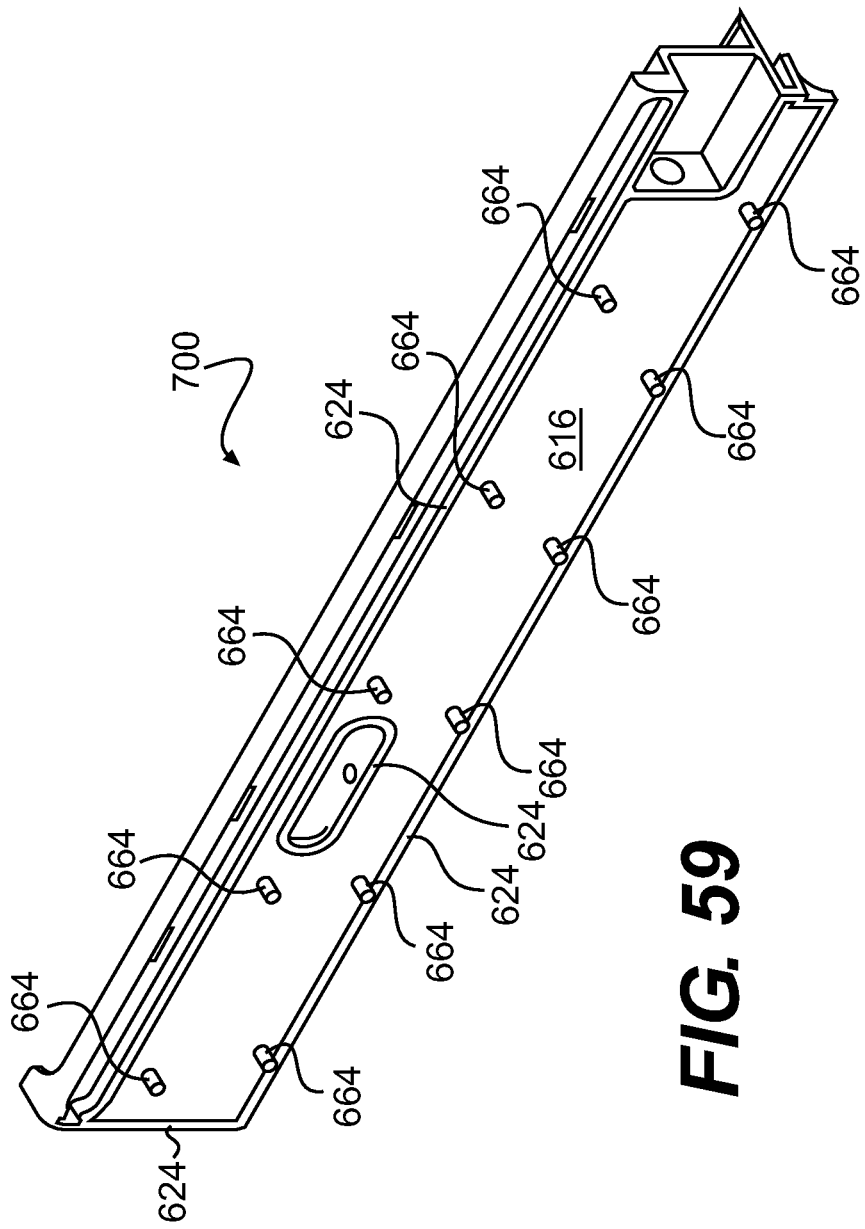
FIG. 59 is an isometric view of a rail in accordance with an embodiment of the invention.

Another assembly part, namely a sliding support 700, illustrated in FIG. 59, is adapted to be secured with the pins 664 and holes securing method presented above. It can be appreciated that there are two rows of pins 664 offering additional clamping force when used in conjunction with their respective holes. Again a cavity 616 bordered by a rib 624 defining a cavity 616 adapted to receive a quantity of bonding material 604 (not illustrated in FIG. 59) therein.

The fixation mode referred to in FIG. 56 through FIG. 59 can be used on miscellaneous assembly parts. In the illustrative case of a galley cart 10, a number of rails 160, resilient members 200 (bumpers), frames 236, modules 90 and/or other assembled parts can be secured with the presented embodiment. This method to "jiglessly" hold an assembly part to a composite base structure could be used on other goods and products without departing from the scope of the present invention.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A plastic part adapted to be secured to a composite material galley cart, the plastic part comprising a surface and at least one pin extending therefrom, the at least one pin being sized and designed to mate with a corresponding at least one hole provided in the composite material galley cart to create a clamping force capable of temporarily securing the plastic part to the composite material galley cart while bonding material between the surface and the composite material galley cart cures to permanently bond the surface to the composite material galley cart, wherein a rib is adapted to contact the composite material galley cart to create a bonding material retaining volume between the surface and the composite material galley cart.

2. The plastic part of claim 1, wherein the surface further comprises a rib adapted to define a cavity for receiving therein the bonding material.

3. The plastic part of claim 2, wherein the rib substantially circumscribes at least a portion of the plastic part surface.

4. The plastic part of claim 2, wherein the rib is provided with a distal chamfer sized and designed to retain bonding material therein between the plastic part and the composite material galley cart.

5. The plastic part of claim 1, wherein the at least one pins includes an axially distal chamfer to facilitate insertion of the at least one pin in the corresponding at least one hole.

6. The plastic part of claim 1, wherein the plastic part is selected from a group consisting of a rail and a bumper, and wherein the composite structure is a galley cart body.

7. A composite material galley cart comprising a plurality of plastic rails therein for slideably supporting trays therein, the rail comprising a surface and at least one pin extending therefrom, the at least one pin being sized and designed to mate with a at least one hole provided in the composite material galley cart to create a clamping force capable of temporarily securing the plastic part to the composite material galley cart while bonding material between the surface and the composite material galley cart cures to permanently bond the surface to the composite material galley cart, wherein the surface further comprises a rib adapted to define a cavity for receiving therein the bonding material and wherein the rib is adapted to contact the composite structure to create a bonding material retaining volume between the surface and the composite material galley cart.

8. The composite material galley cart of claim 7, wherein the rib is provided with a distal peripheral chamfer sized and designed to retain bonding material therein between the plastic part and the composite material galley cart.

9. The composite material galley cart of claim 7, wherein the at least one pin includes an axially distal chamfer to facilitate insertion of the at least one pin in the corresponding at least one hole.

10. A method of securing a plastic part to a composite galley cart, the method comprising:
   providing a composite galley cart;
   performing at least one hole in the composite galley cart;
   providing a plastic part including a surface and at least one pin extending therefrom, the at least one pin being sized and designed to mate with the at least one hole to create a clamping force capable of temporarily securing the plastic part to the composite galley cart;
   applying bonding material between the surface and the composite galley cart to bond the surface to the composite galley cart;
   engaging the at least one pin with the corresponding at least one hole and adding pressure to insert the at least one pin with the corresponding at least one hole and spreading the bonding material between the plastic part and the composite galley cart; and
   curing the bonding material to permanently secure the additional part to the composite galley cart, wherein a rib is adapted to contact the composite galley cart to create a bonding material retaining volume between the surface and the composite galley cart.

11. The method of claim 10, further comprising removing the excess of bonding material around the plastic part prior to cure the bonding material.

12. The method of claim 10, wherein the rib is adapted to define a cavity for receiving therein the bonding material.

13. The method of claim 12, wherein the rib substantially circumscribes at least a portion of the plastic part surface.

14. The method of claim 12, wherein the rib is provided with a distal peripheral chamfer sized and designed to retain bonding material therein between the plastic part and the composite galley cart.

15. The method of claim 10, wherein the at least one pin includes an axially distal chamfer to facilitate insertion of the at least one pin in the corresponding at least one hole.

16. The method of claim 10, wherein the at least one hole is a raw hole having composite fibers extending therein to further ensure a press fit with the corresponding at least one pin.

17. The method of claim 10, wherein the plastic part is selected from a group consisting of a rail and a bumper, and wherein the composite galley cart is a galley cart body.

* * * * *